(12) United States Patent
Odom et al.

(10) Patent No.: US 10,114,128 B1
(45) Date of Patent: Oct. 30, 2018

(54) RADIATION SENSOR

(71) Applicant: Hunter Well Science, Inc., Arlington, TX (US)

(72) Inventors: Richard Odom, Benbrook, TX (US); Jimmy Don Starnes, Fort Worth, TX (US)

(73) Assignee: Hunter Well Science, Inc., Arlington, TX (US)

( * ) Notice: Subject to any disclaimer, the term of this patent is extended or adjusted under 35 U.S.C. 154(b) by 0 days.

(21) Appl. No.: 15/954,087

(22) Filed: Apr. 16, 2018

Related U.S. Application Data

(63) Continuation of application No. 15/809,021, filed on Nov. 10, 2017, now Pat. No. 9,971,041.

(51) Int. Cl.
| G01D 18/00 | (2006.01) |
| G01T 1/20 | (2006.01) |
| G01V 5/12 | (2006.01) |
| G01V 13/00 | (2006.01) |

(52) U.S. Cl.
CPC .............. G01T 1/2002 (2013.01); G01V 5/12 (2013.01); G01V 13/00 (2013.01)

(58) Field of Classification Search
CPC ......... G01T 1/2002; G01V 5/12; G01V 13/00
USPC ...................................................... 250/252.1
See application file for complete search history.

(56) References Cited

U.S. PATENT DOCUMENTS

| 2,961,539 | A | 11/1960 | Egan et al. |
| 3,103,812 | A | 9/1963 | Bourne, Jr. et al. |
| 3,123,709 | A | 3/1964 | Caldwell et al. |
| 3,511,989 | A | 5/1970 | Yakubovich et al. |
| 3,688,115 | A | 8/1972 | Antkiw |
| 4,490,609 | A | 12/1984 | Chevalier |
| 4,558,220 | A | 12/1985 | Evans |
| 5,205,167 | A | 4/1993 | Gartner et al. |
| 5,359,195 | A | 10/1994 | Gartner et al. |
| 5,680,431 | A | 10/1997 | Pietras, III et al. |
| 5,689,540 | A | 11/1997 | Stephenson et al. |
| 5,736,636 | A | 4/1998 | Mozelev et al. |
| 7,075,062 | B2 | 7/2006 | Chen et al. |
| 7,321,123 | B2 | 1/2008 | Simonetti et al. |
| 7,507,952 | B2 | 3/2009 | Groves et al. |
| 7,542,543 | B2 | 6/2009 | Shampine et al. |
| 7,564,948 | B2 | 7/2009 | Wraight et al. |
| 7,639,781 | B2 | 12/2009 | Shampine et al. |
| 7,684,540 | B2 | 3/2010 | Groves et al. |

(Continued)

*Primary Examiner* — David Porta
*Assistant Examiner* — Meenakshi Sahu
(74) *Attorney, Agent, or Firm* — D. Tiller Law PLLC; Donald Tiller

(57) ABSTRACT

Technology for estimating the density of a material is disclosed. A radiation sensor includes at least two radiation detectors each configured to produce electronic signals having a characteristic time parameter, a pulse-shape discriminator to distinguish amongst the detector signals using the characteristic time parameters, and radiation shielding that is configured to provide different radiation paths to the detectors wherein the different radiation paths include at least some different material. A method includes providing at least two detectors and two radiation paths through a radiation shield, measuring the intensity of radiation at each of the detectors, and combining the measures of intensity to estimate a density of a material found in greater amounts in one radiation path than in the other radiation path.

8 Claims, 22 Drawing Sheets

(56) References Cited

U.S. PATENT DOCUMENTS

| | | |
|---|---|---|
| 7,817,781 B2 | 10/2010 | Wraight et al. |
| 7,991,111 B2 | 8/2011 | Wraight et al. |
| 8,511,379 B2 | 8/2013 | Spross et al. |
| 8,704,159 B2 | 4/2014 | DiFoggio |
| 2003/0106993 A1* | 6/2003 | Chen .................. G01V 5/12 |
| | | 250/269.1 |
| 2011/0002443 A1 | 1/2011 | Wraight et al. |

* cited by examiner

A – A'

B – B'

C – C'

FIG. 4
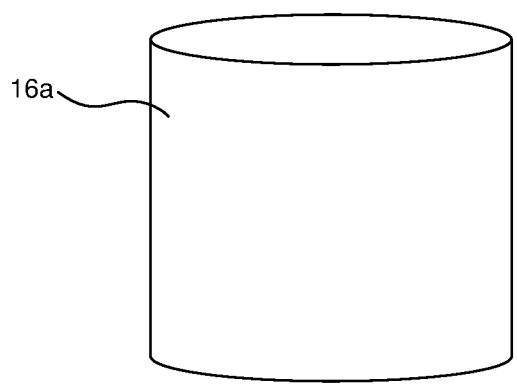
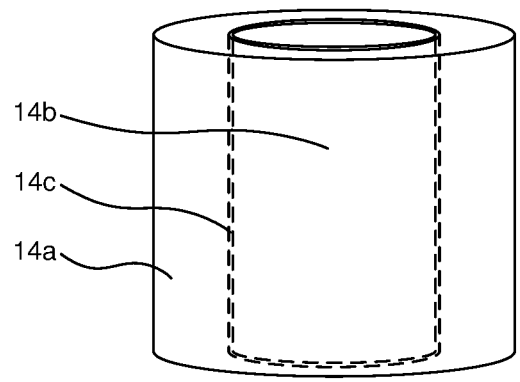

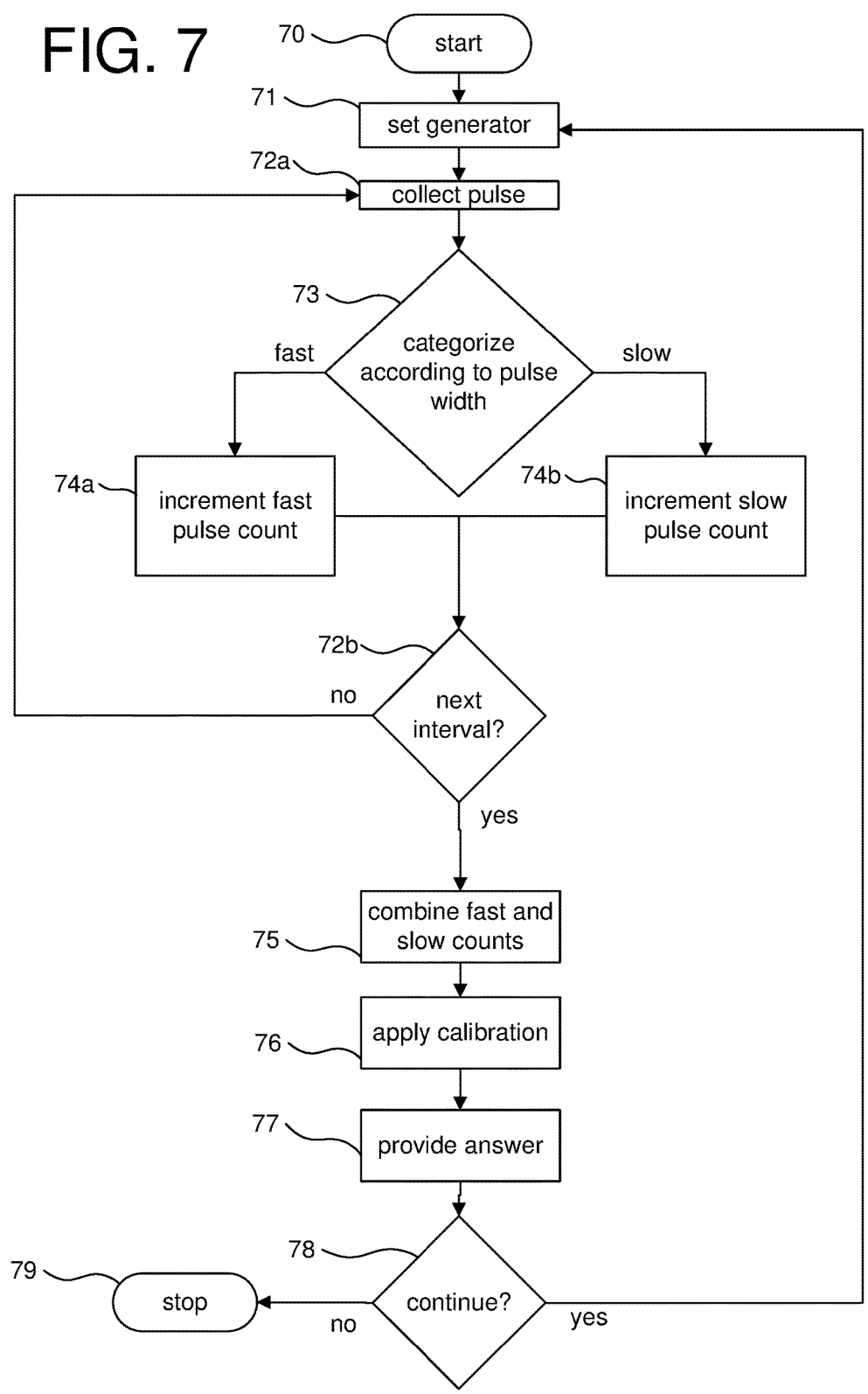

A1 – A1'

B1 – B1'

C1 – C1'

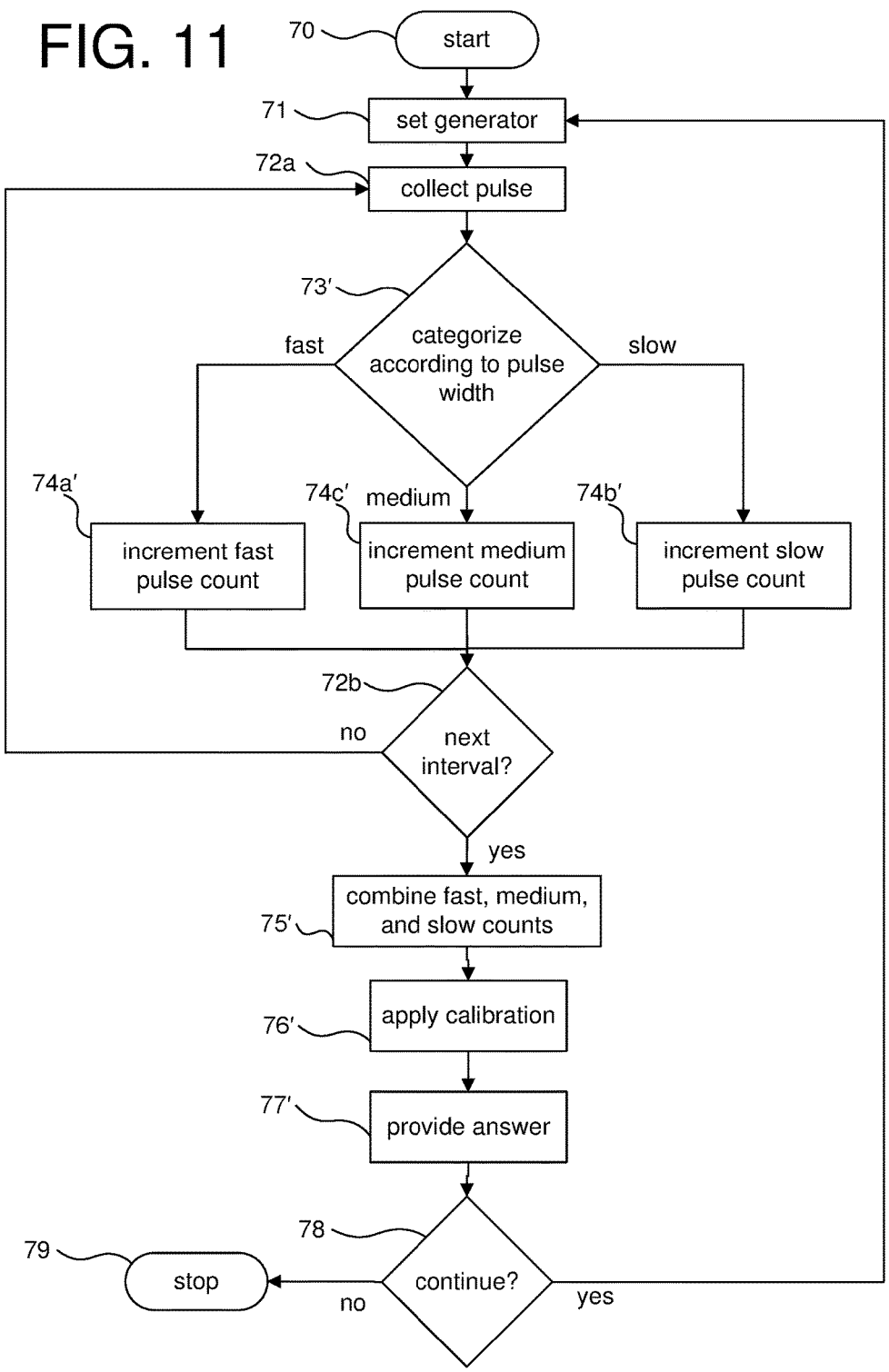

RADIATION SENSOR

CROSS-REFERENCE TO RELATED APPLICATIONS

This application is a continuation of U.S. patent application Ser. No. 15/809,021, filed on Nov. 10, 2017.

BACKGROUND

This invention pertains generally to technology for sensing and measuring electromagnetic radiation (photons) using scintillator devices. More particularly, the invention pertains to a configuration of scintillation material, shielding, and radiation source that may be used to measure properties of material in or around a wellbore (borehole). For example, the invention may be used to efficiently measure the density of fluid in the borehole when deployed in a wireline or other logging tool.

Prior-art systems for the measurement of fluid density in producing oil and gas wells are based on a sensor with a radio-isotope source such as $^{241}$Am. Radiation from the source traverses the borehole fluid in an open sample cell and the counts received by a detector on the opposing end of the sample cell are dependent on the fluid density. In these prior-art systems the use of radio-isotopes cause concerns for health and safety of personnel and security of radio-isotopes.

Miniature x-ray tubes are viable alternate radiation sources if the output of the tube can be accurately measured. In laboratory and industrial applications, a separate output-monitor detector is added to monitor tube output. Use of a separate output-monitor detector for in situ measurements in a borehole is problematic due to space constraints that constrain sensors to a small diameter and long aspect.

SUMMARY

This invention uses the geometry of the sample cell to focus certain radiation paths on certain parts of a multi-faceted detector. Each facet of the detector is a certain scintillation crystal with a specific emission time, thus the light received by a photomultiplier tube can be sorted by species and related to a specific path of the radiation. Depending on sample cell design and detector faceting, the invention can be configured to measure: tube output, transmission through the wellbore fluid, and back-scattering of radiation by the wellbore fluid surrounding the sensor.

In one aspect of the invention, a photon sensor includes at least two scintillators (e.g., YSO, CaF$_2$), each having scintillation-light-time characteristics distinguishable from scintillation-light-time characteristics of the other scintillators. These scintillators are each coupled to a common photodetector (e.g., photomultiplier tube). The signals generated by the photodetector (and support electronics) have timing characteristics reflective of the scintillation-light-time characteristics and are thereby distinguishable. The photon sensor further includes shielding configured to enhance the sensitivity of the scintillators to photons travelling along certain paths as compared to photons traveling other paths. Different scintillators are sensitive to different paths. The photon sensor further includes a pulse-shape discriminator capable of distinguishing signals based on the scintillator in which the signal originates.

In another aspect of the invention, a fluid-density logging tool includes at least two scintillators (e.g., YSO, CaF$_2$), each having scintillation-light-time characteristics distinguishable from scintillation-light-time characteristics of the other scintillators. These scintillators are each coupled to a common photodetector (e.g., photomultiplier tube). The signals generated by the photodetector (and support electronics) have timing characteristics reflective of the scintillation-light-time characteristics and are thereby distinguishable. The logging tool further includes a means for enhancing the sensitivity of the different scintillators to different radiation paths. At least one scintillator is sensitive to a path through material of a known density and at least one scintillator is sensitive to a path through material of an unknown density. The logging tool further includes a means for distinguishing signals based on the scintillator in which the signal originates.

In another aspect of the invention, a method for determining the density of a material includes detecting photons with at least one of multiple scintillators, each scintillator having a characteristic scintillation-light-decay time that is distinguishable from the characteristic scintillation-light-decay time of the other scintillators. The method further includes determining which scintillator detected the photon based on the characteristic scintillation-light-decay time. The method further includes combining the number of events detected based on the detecting scintillator (e.g., dividing the number of events in one scintillator by the number of events in a second scintillator). The method further includes applying a calibration to the combination to provide a measure of the density of the material through which the photons detected by at least one of the scintillators passed.

BRIEF DESCRIPTION OF THE DRAWINGS

These and other features, aspects, and advantages of the present invention will become better understood with reference to the following description, appended claims, and accompanying drawings where:

FIG. 4 is a partially exploded isometric view of an exemplary detector assembly of an exemplary x-ray sensor.

FIG. 7 illustrates an exemplary operational flow of a fluid-density tool including an exemplary two-scintillator x-ray sensor.

FIG. 11 illustrates an exemplary operational flow of a fluid-density tool including an exemplary three-scintillator x-ray sensor.

DETAILED DESCRIPTION

Figure 1:
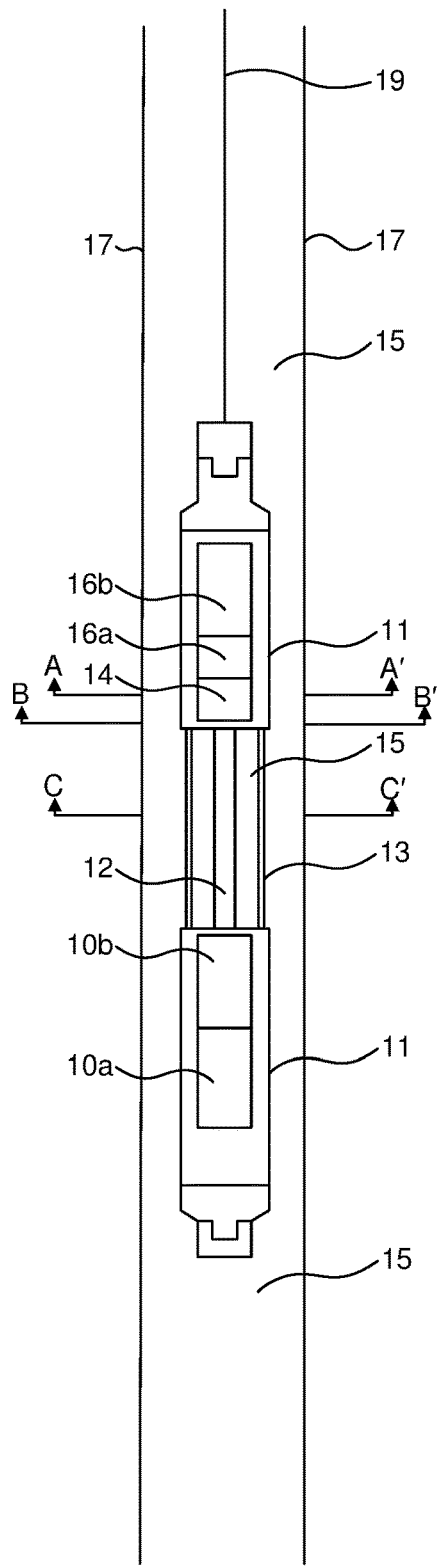
FIG. 1 illustrates an exemplary x-ray sensor integrated into a fluid-density tool disposed in a borehole.

In the summary above, and in the description below, reference is made to particular features of the invention in the context of exemplary embodiments of the invention. The features are described in the context of the exemplary embodiments to facilitate understanding. But the invention is not limited to the exemplary embodiments. And the features are not limited to the embodiments by which they are described. The invention provides a number of inventive features which can be combined in many ways, and the invention can be embodied in a wide variety of contexts. Unless expressly set forth as an essential feature of the invention, a feature of a particular embodiment should not be read into the claims unless expressly recited in a claim.

Except as explicitly defined otherwise, the words and phrases used herein, including terms used in the claims, carry the same meaning they carry to one of ordinary skill in the art as ordinarily used in the art.

Because one of ordinary skill in the art may best understand the structure of the invention by the function of various structural features of the invention, certain structural features may be explained or claimed with reference to the function of a feature. Unless used in the context of describing or claiming a particular inventive function (e.g., a process), reference to the function of a structural feature refers to the capability of the structural feature, not to an instance of use of the invention.

Except for claims that include language introducing a function with "means for" or "step for," the claims are not recited in so-called means-plus-function or step-plus-function format governed by 35 U.S.C. § 112(f). Claims that include the "means for [function]" language but also recite the structure for performing the function are not means-plus-function claims governed by § 112(f). Claims that include the "step for [function]" language but also recite an act for performing the function are not step-plus-function claims governed by § 112(f).

Except as otherwise stated herein or as is otherwise clear from context, the inventive methods comprising or consisting of more than one step may be carried out without concern for the order of the steps.

The terms "comprising," "comprises," "including," "includes," "having," "haves," and their grammatical equivalents are used herein to mean that other components or steps are optionally present. For example, an article comprising A, B, and C includes an article having only A, B, and C as well as articles having A, B, C, and other components. And a method comprising the steps A, B, and C includes methods having only the steps A, B, and C as well as methods having the steps A, B, C, and other steps.

Terms of degree, such as "substantially," "about," and "roughly" are used herein to denote features that satisfy their technological purpose equivalently, though perhaps not identically, to a feature that is "exact." For example, a component A is "substantially" perpendicular to a second component B if A and B are at an angle such as to equivalently satisfy the technological purpose of A being perpendicular to B.

Except as otherwise stated herein, or as is otherwise clear from context, the term "or" is used herein in its inclusive sense. For example, "A or B" means "A or B, or both A and B."

Electromagnetic radiation (photons) such as x-rays and gamma-rays, as is well known in the art, interacts with material through a number of mechanisms, such as Rayleigh scattering, Compton scattering, the photoelectric effect, pair production, and photonuclear absorption. The combined effect of these interactions on a beam of photons passing through a layer of material can be represented by the following equation:

$$I = I_0 e^{-\mu \rho x}$$

Here, I is the intensity of the photon beam exiting the material, $I_0$ is the intensity of the photon beam incident on the material, $\mu$ is the mass-attenuation coefficient of the material, $\rho$ is the density of the material, and x is the thickness of the layer of material. The mass-attenuation coefficient is a function of the material and of the energy of the incident photon. For materials consisting of homogenous mixtures or compounds of atomic constituents, the mass-attenuation coefficient of the mixture or compound is the weighted sum of the mass-attenuation coefficients of the constituents:

$$\mu = \sum_{i=1}^{n} w_i \mu_i$$

Here, $w_i$ is the fraction by weight of the $i^{th}$ constituent and is the mass-attenuation coefficient of the $i^{th}$ constituent. Thus, a measure of the attenuation of a photon beam travelling through a material provides information about the density and makeup of the material:

$$-\ln\left(\frac{I}{I_0}\right) = (\mu x) \rho$$

Electromagnetic radiation such as x-rays or gamma-rays, as is well known in the art, may be provided by a chemical source or by a generator. Chemical sources provide the photons through radioactive decay of an isotope. The intensity and energy distribution of the photons is a function of the isotope. Generators, typically comprising a tube and control circuitry, provide photons by accelerating a charged particle (e.g., an electron) through an electric potential (a voltage difference) to collide with a target in the tube. The kinetic energy of the charged particle is converted in part to photonic energy. The intensity of the photon beam produced at the target is a function of the number of accelerated charged particles (the current) and the maximum energy of the photons in the beam is a function of the potential through which the particles are accelerated (the voltage). Thus, by controlling the current and voltage of the generator, an operator may control the intensity and energy distribution of the photon beam.

Scintillators, as is well known in the art, are materials that produce light when excited by ionizing radiation. For example, ionizing electromagnetic radiation such as x-ray or gamma-ray photons interact with the material to place the material into an excited energy state. Deexcitation of the material produces light (e.g., photons in the visible or near-visible range). The characteristics of the excitation and deexcitation process, and thus the characteristics of the light emission, depend in part on the scintillation material. For example, the amount of scintillation light produced by the scintillator per unit of energy deposited by the ionizing radiation varies from scintillator material to scintillator material. Similarly, the time variance of the scintillation light produced by the scintillator varies from scintillator material to scintillator material. For many materials, this time variance may be approximated as short period of excitation followed by a longer period in which the intensity (amount) of scintillation light produced decays exponentially:

$$I_S(t) = I_{S\_0} \left( e^{-\frac{t}{\tau_D}} - e^{-\frac{t}{\tau_B}} \right)$$

Here, $I_S(t)$ indicates the intensity of scintillation output as a function of time (t), $I_{S\_0}$ indicates the maximum intensity, $\tau_D$ indicates the characteristic light-decay time, and $\tau_B$ indicates the characteristic excitation time. Thus, a scintillator may be distinguished from another scintillator based on the shape or width of the scintillation light pulse. Common inorganic scintillators include, for example, NaI(Tl), CsI(Tl), BGO, CaF$_2$(Eu), BaF$_2$, YAP(Ce), YSO(Ce), LYSO(Ce), LSO(Ce), and LaCl$_3$(Ce). There are also a variety of organic scintillators.

Electronic photodetectors, or light sensors, as is well-known in the art, are devices that convert light (photons in the visible or near-visible range) into electronic signals (e.g., voltage or current pulses). Photomultiplier tubes and photodiodes are examples of electronic photodetectors.

Pulse-shape discriminators (PSDs), including pulse-width discriminators (PWDs), refer to a well-known class of signal-processing structures. These structures may be implemented in hardware or software or some combination thereof. These structures use timing characteristics of a signal, such as rise time, decay time, and width, to categorize a signal. For example, a pulse-shape discriminator may categorize all signals according to the duration of the signal's decay tail. And a pulse-width discriminator may categorize signals according to the full width at half maximum of the signal. Signals with a common timing characteristic falling within a particular range of durations are considered of the same category.

Single-channel analyzers (SCAs) and multi-channel analyzers (MCAs) refer to a class of well-known signal-processing structures. These structures may be implemented in hardware or software or some combination thereof. These structures use magnitude characteristics of a signal to categorize a signal. A single-channel analyzer counts all signals above a lower threshold and below an upper threshold as a single category. A multi-channel analyzer will divide the range of magnitudes within the upper and lower thresholds into multiple categories (ranges of magnitudes) and separately count the signals according to the magnitude range they fall within.

An exemplary fluid-density instrument incorporating an exemplary x-ray sensor according to an embodiment of the invention is shown in FIG. 1. The instrument is depicted attached to a wireline 19 and disposed in a borehole defined by a casing 17 and a borehole fluid 15. A scintillator assembly 14 is optically coupled to a photomultiplier tube 16a which is electrically or magnetically coupled to pulse-processing circuitry 16b. The scintillator assembly 14 is positioned within a section of a housing 11 and spaced apart from an x-ray source 10b. The x-ray source 10b, here an x-ray generator tube, is controlled through control circuitry 10a. The x-ray source 10b and control circuitry 10a are positioned within a section of the housing 11. A measurement cage comprising a tube 12 and support member 13 is positioned between the scintillator assembly 14 and the x-ray source 10b. The cage includes a volume between the support member 13 and the outside surface of the tube 12 that is open to borehole fluid 15. The inside surface of the tube 12 defines a volume that excludes the borehole fluid 15 (but may include material of a known density such as boron carbide or nitrogen). X-rays originating at the x-ray source 10b travel through the various materials defining the borehole and instrument environment. Some x-rays travel through the fluid-excluding volume of the tube 12 to the scintillator assembly 14 where they are detected. Other x-rays travel through the fluid-filled volume of the cage to the scintillator assembly 14 where they are detected. Measurement of characteristics of the detected x-rays (e.g., number of x-rays detected per unit time and the energy distribution of the detected x-rays) can provide information regarding characteristics of the borehole environment, such as the density of the borehole fluid.

Figure 2A:
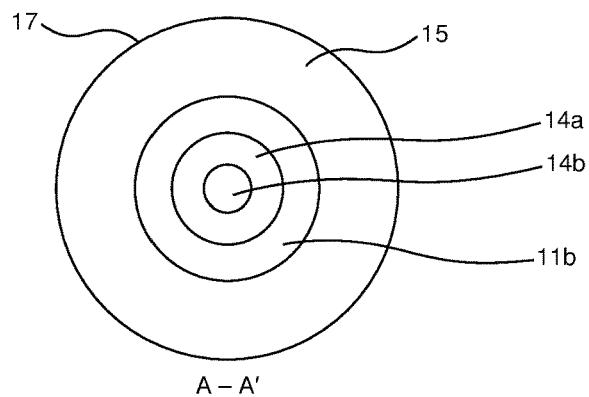
FIGS. 2a-2c are sectional views of an exemplary two-scintillator x-ray sensor integrated into a fluid-density tool disposed in a borehole.
Figure 3:
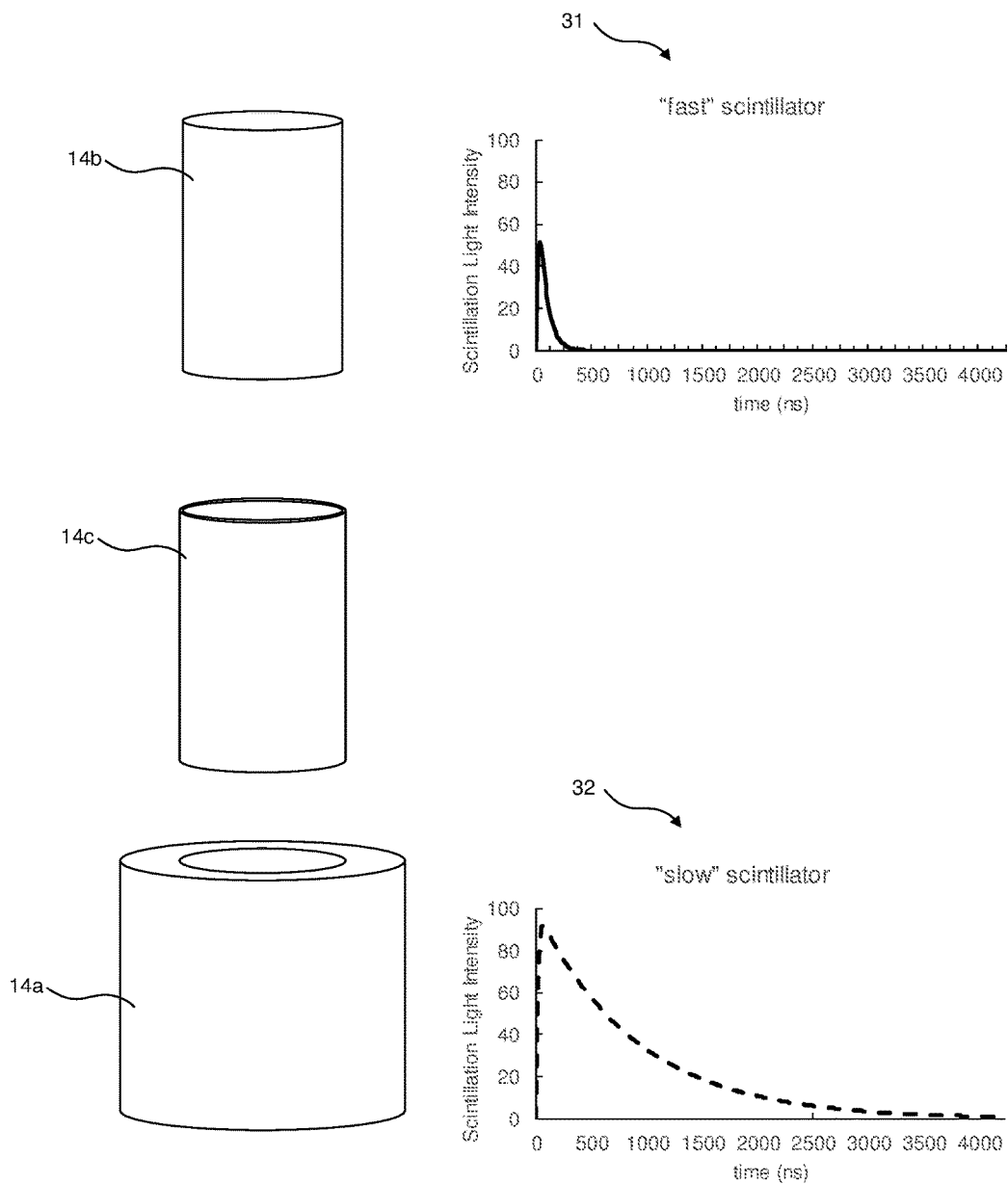
FIG. 3 is an exploded isometric view of an exemplary scintillator assembly of an exemplary x-ray sensor.

The exemplary scintillator assembly 14 can be understood with reference to FIG. 2a (a view of section A-A' of FIG. 1) and FIG. 3 (an exploded view of a variant of the assembly 14). The scintillator assembly 14 includes a first scintillator element 14a and a second scintillator element 14b. The first scintillator element 14a is configured in a ring shape (roughly a disk with a hole through the center) such that the second scintillator element 14b fits within the hole defined by the first scintillator element 14b. Scintillator assembly 14 is a coaxial assembly of the first and second scintillator elements 14a, 14b. An x-ray shield 14c may optionally be coaxially disposed between the first scintillator element 14a and the second scintillator element 14b.

The materials of the first and second scintillator elements 14a, 14b differ with respect to the time characteristics of the scintillation light output. The idealized plots of scintillation light intensity versus time (light pulses) 31, 32 depicted in FIG. 3 show scintillation materials that differ primarily with respect to light decay time. The "fast" scintillation material of the second scintillator element 14b produces all its scintillation light corresponding to a scintillation event (an interaction of an x-ray with the scintillation material) in a shorter period of time than does the scintillation material of the first scintillator element 14a. This scintillation-time-characteristic distinction between the first scintillator element 14a and the second scintillator element 14b allows for distinguishing events in the first scintillator element 14a from events in the second scintillator element 14b based on light-pulse shape. Thus, as shown in FIG. 4 (a partially exploded view of the coupled scintillator assembly 14 and photomultiplier tube 16a), a common photomultiplier tube 16a can be used to convert scintillation light from the assembly 14 to electronic signals for processing by pulse-processing circuitry 16b while preserving the ability to identify the source of the scintillation event as either in the first scintillator element 14a or the second scintillator element 14b.

Figure 2B:
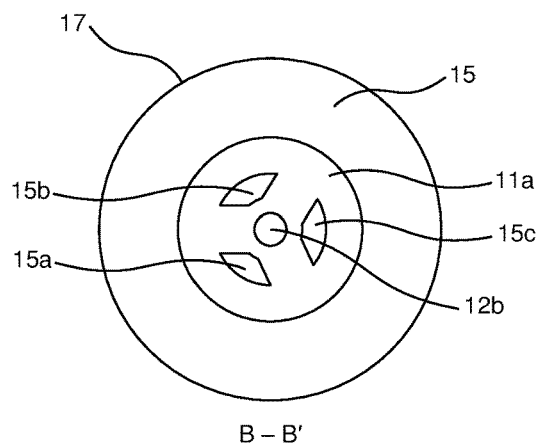
Figure 2C:
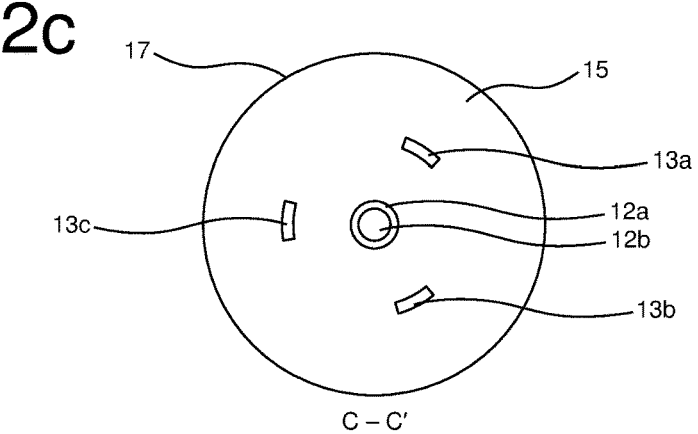
Figure 5:
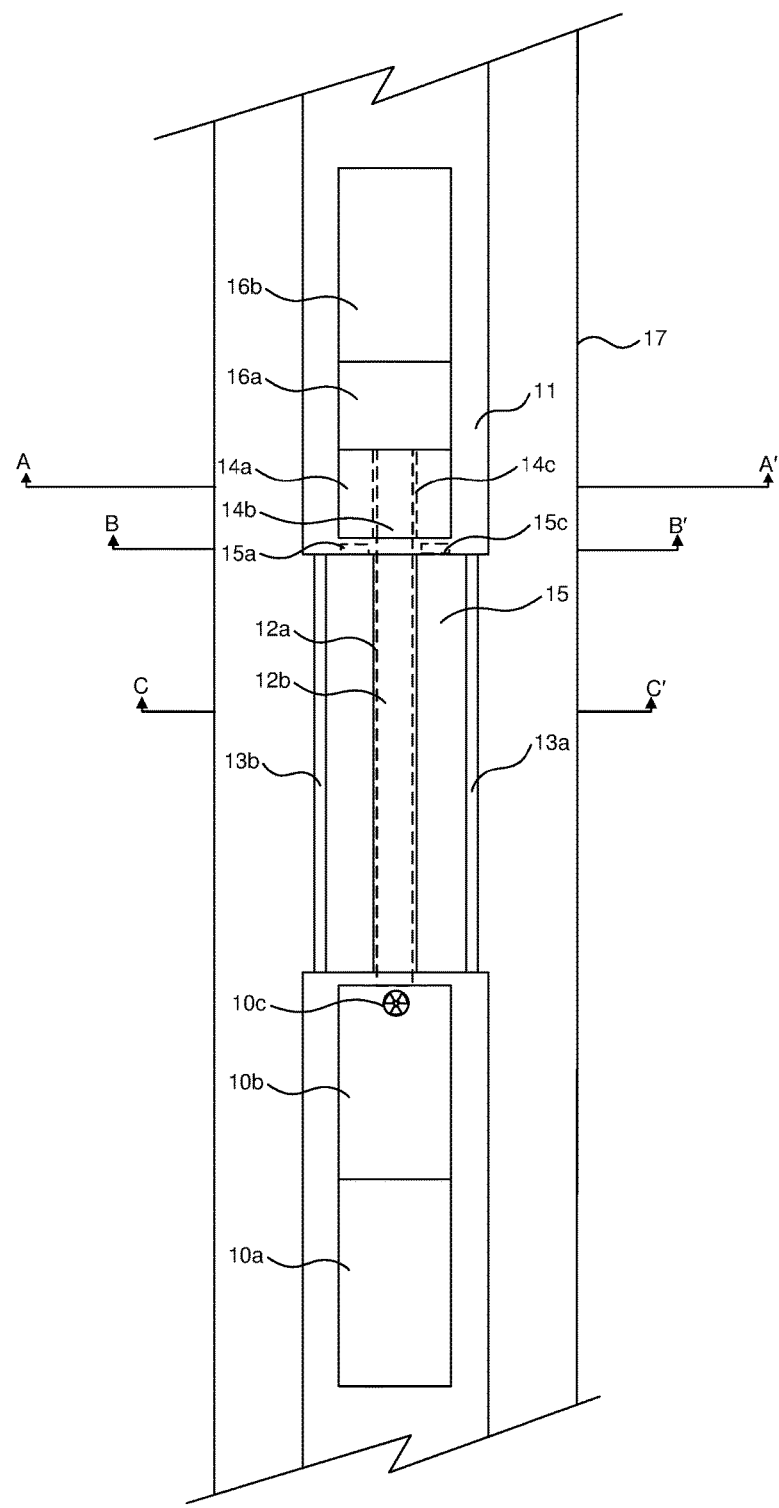
FIG. 5 illustrates a portion of a fluid-density tool including an exemplary x-ray sensor.

The materials of the tube 12, support members 13, and housing 11 are chosen and structured to shield portions of the scintillator assembly 14 from x-rays that travel through one path less than from x-rays that travel through different paths. For example, as depicted in FIGS. 2a, 2b, and 2c (sectional views of section A-A', B-B', C-C' of FIG. 1, respectively) and FIG. 5 (a view of a portion of FIG. 1), the housing 11 and tube 12 may be structured such that: (1) the first scintillator element 14a is more sensitive to x-rays traveling through borehole fluid 15 than to x-rays traveling through the fluid-excluding volume 12b of the tube 12 and (2) the second scintillator element 14b is more sensitive to x-rays traveling through the fluid-excluding volume 12b of the tube 12 than to x-rays traveling through the borehole fluid 15. The support member 13 comprises three support-member elements 13a, 13b, 13c that provide the necessary structural support while allowing the borehole fluid 15 to occupy the space between the casing 17 and the outer surface of the tube 12. The tube 12 comprises the annular material 12a and the fluid-excluding volume 12b. The portion 11a of the housing 11 positioned between the source 10b and scintillator assembly 14 includes several separated longitudinally-thinner sections (along the wireline tool's longitudinal axis) that define further volumes 15a, 15b, 15c open to borehole fluid 15. The portion 11b of the housing 11 positioned coaxially around the scintillator assembly 14 is of uniform radial thickness. The combination of the wall 12a of the tube 12, the portion 11a of the housing 11, and the portion 11b of the housing 11 provides the first scintillator element 14a with less shielding from x-rays that travel from the x-ray generating target 10c of the source 10b through the volume of borehole fluid 15 radially within the support member 13 volume than from x-rays that travel other paths. The same combination provides the second scintillator element 14b with less shielding from x-rays that travel from the x-ray generating target 10c of the source 10b through the fluid-excluding volume 12b of the tube 12 than from x-rays that travel other paths. Thus, (1) events in the first scintillator element 14a primarily indicate interactions of x-rays with the borehole fluid, and (2) events in the second scintillator element 14b primarily indicate the output of the source. The rates of events (intensity) in the two scintillator elements 14a, 14b may be combined to provide an indication of x-ray attenuation, and thus borehole-fluid density.

Figure 6:
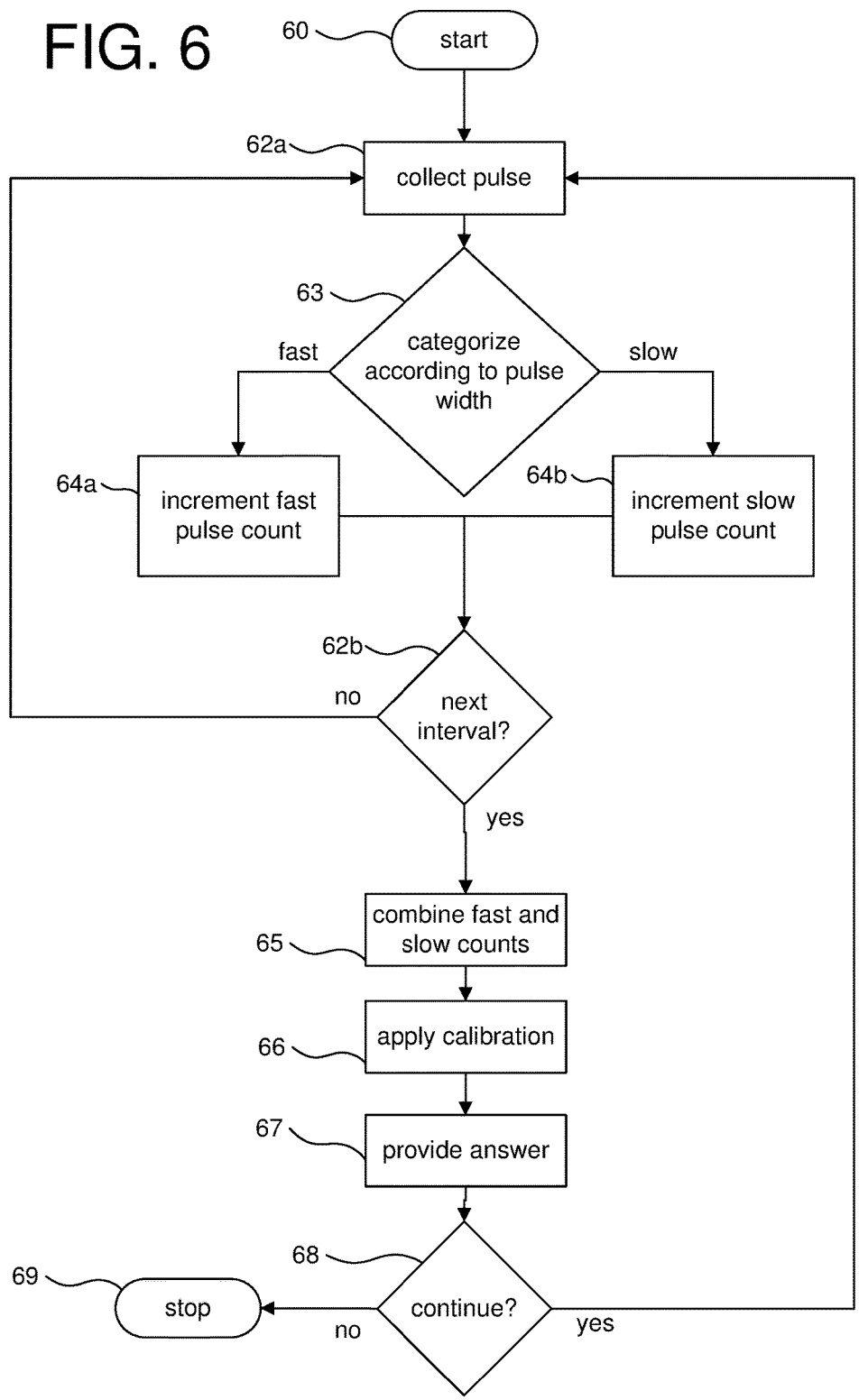
FIG. 6 illustrates an exemplary operational flow of a fluid-density tool including an exemplary two-scintillator x-ray sensor.
Figure 8A:
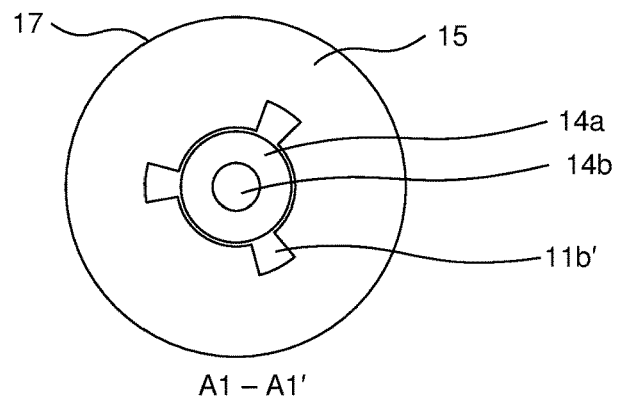
FIGS. 8a-8c are sectional views of an exemplary two-scintillator x-ray sensor integrated into a fluid-density tool disposed in a borehole.
Figure 8B:
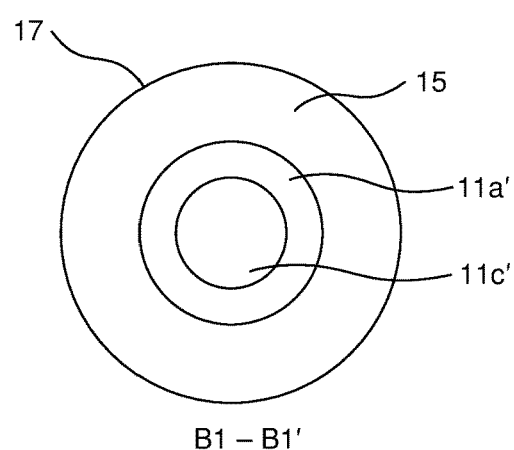
Figure 8C:
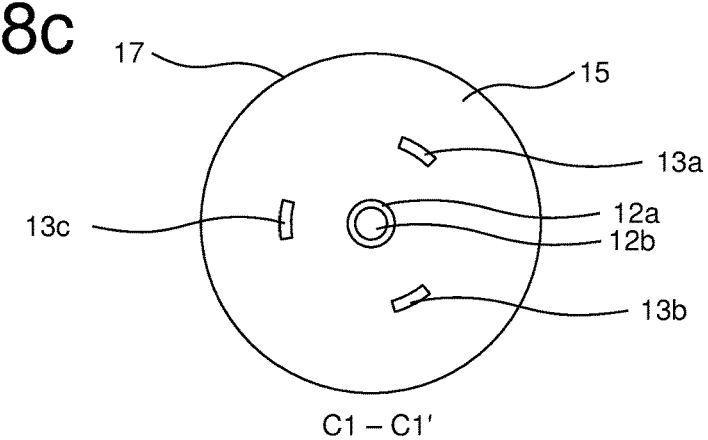
Figure 8D:
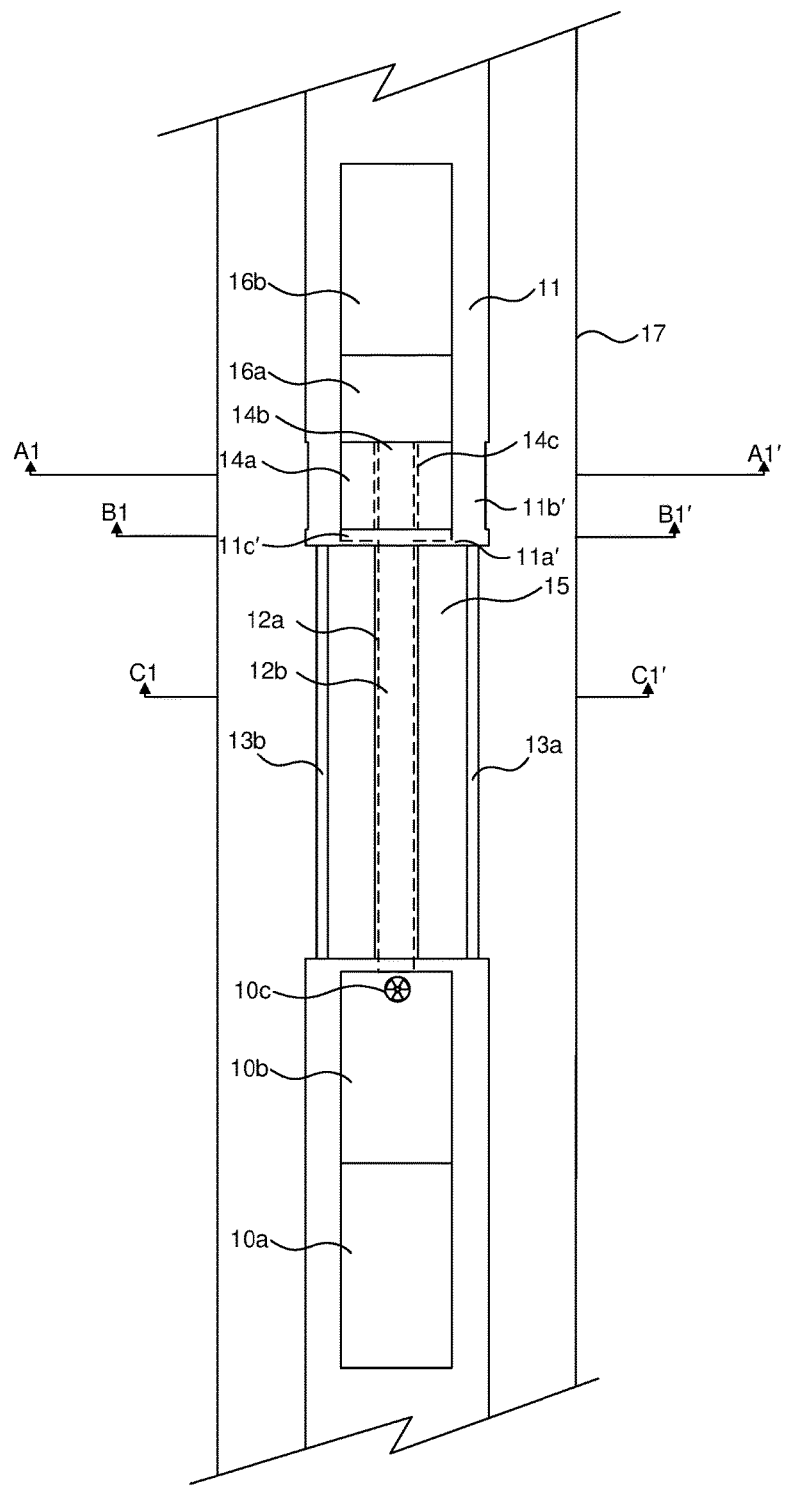
FIG. 8d illustrates a portion of a fluid-density tool including an exemplary x-ray sensor.
Figure 9A:
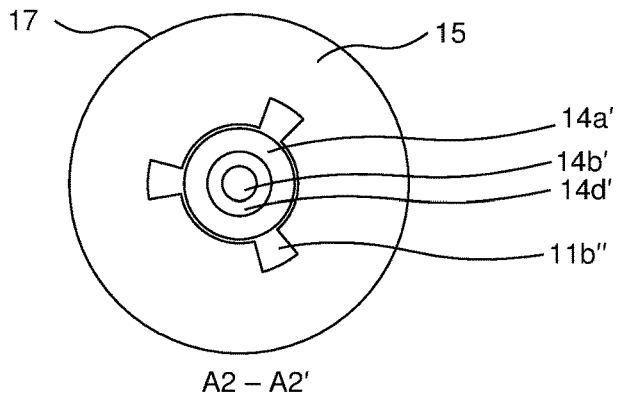
FIGS. 9a-9c are sectional views of an exemplary three-scintillator x-ray sensor integrated into a fluid-density tool disposed in a borehole.
Figure 9B:
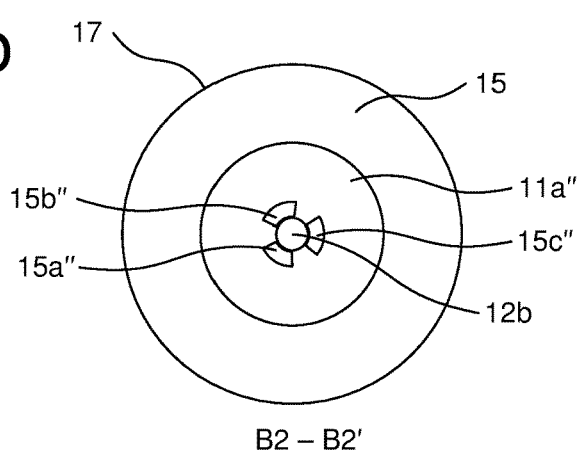
Figure 9C:
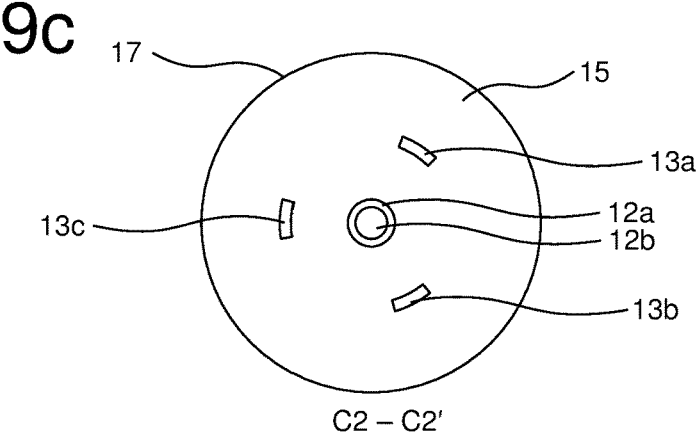
Figure 9D:
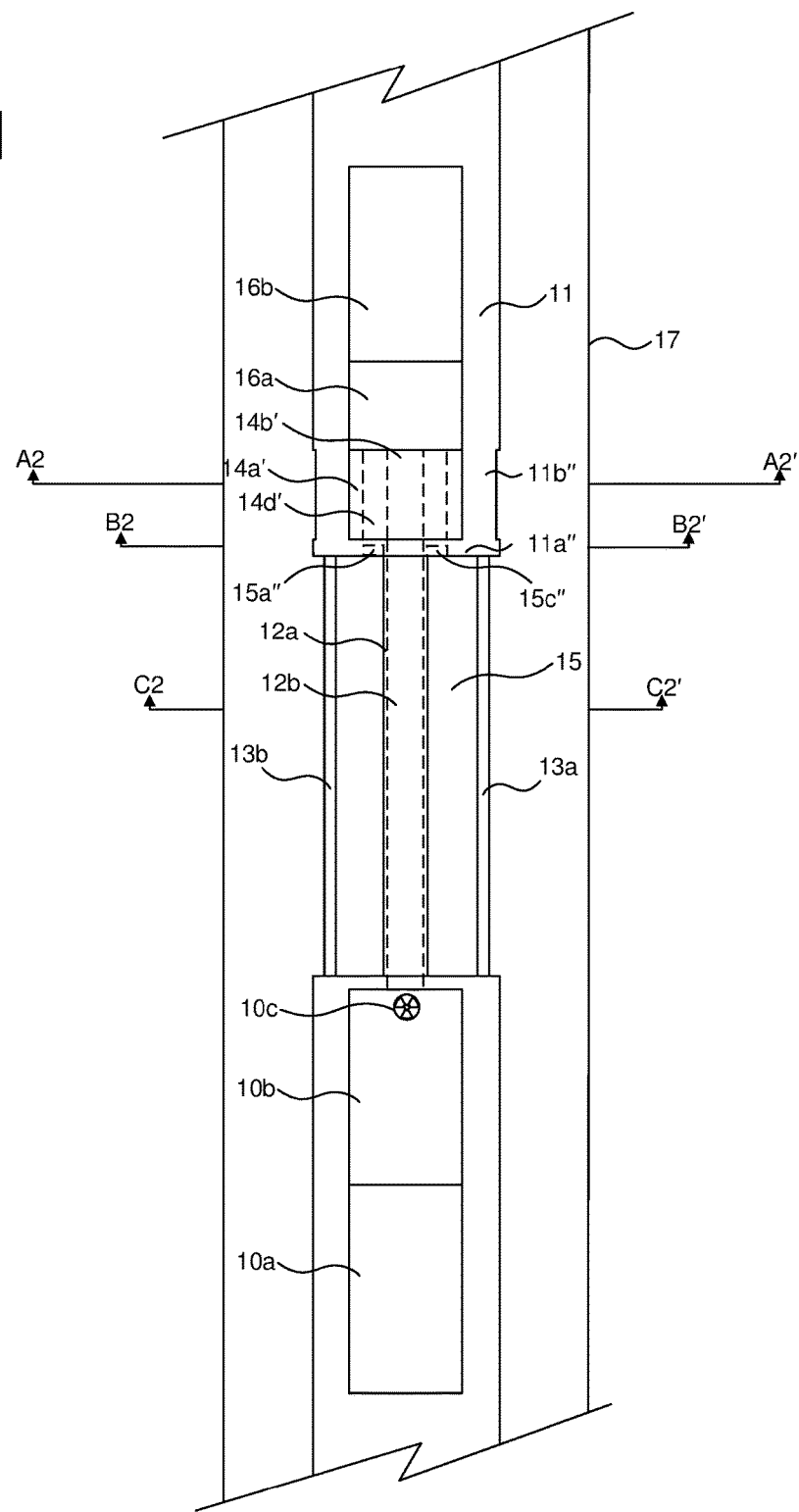
FIG. 9d illustrates a portion of a fluid-density tool including an exemplary x-ray sensor.
Figure 10A:
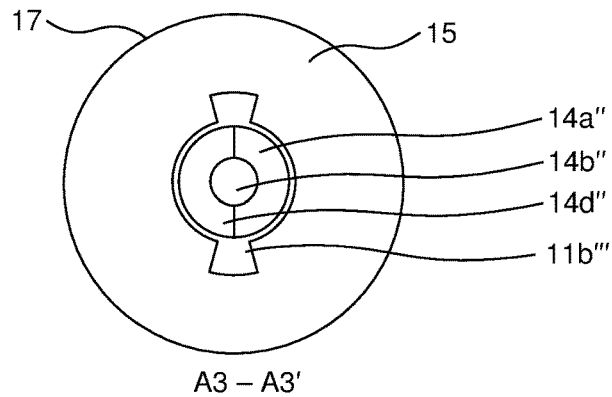
FIGS. 10a-10c are sectional views of an exemplary three-scintillator x-ray sensor integrated into a fluid-density tool disposed in a borehole.
Figure 10B:
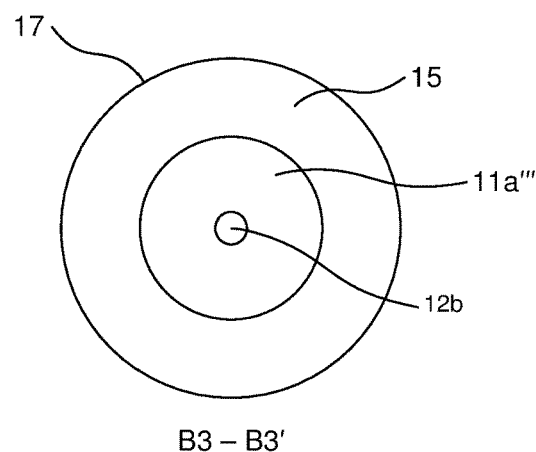
Figure 10C:
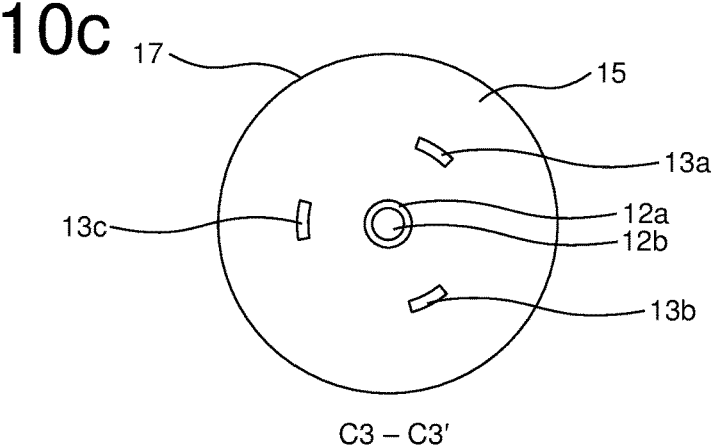
Figure 10D:
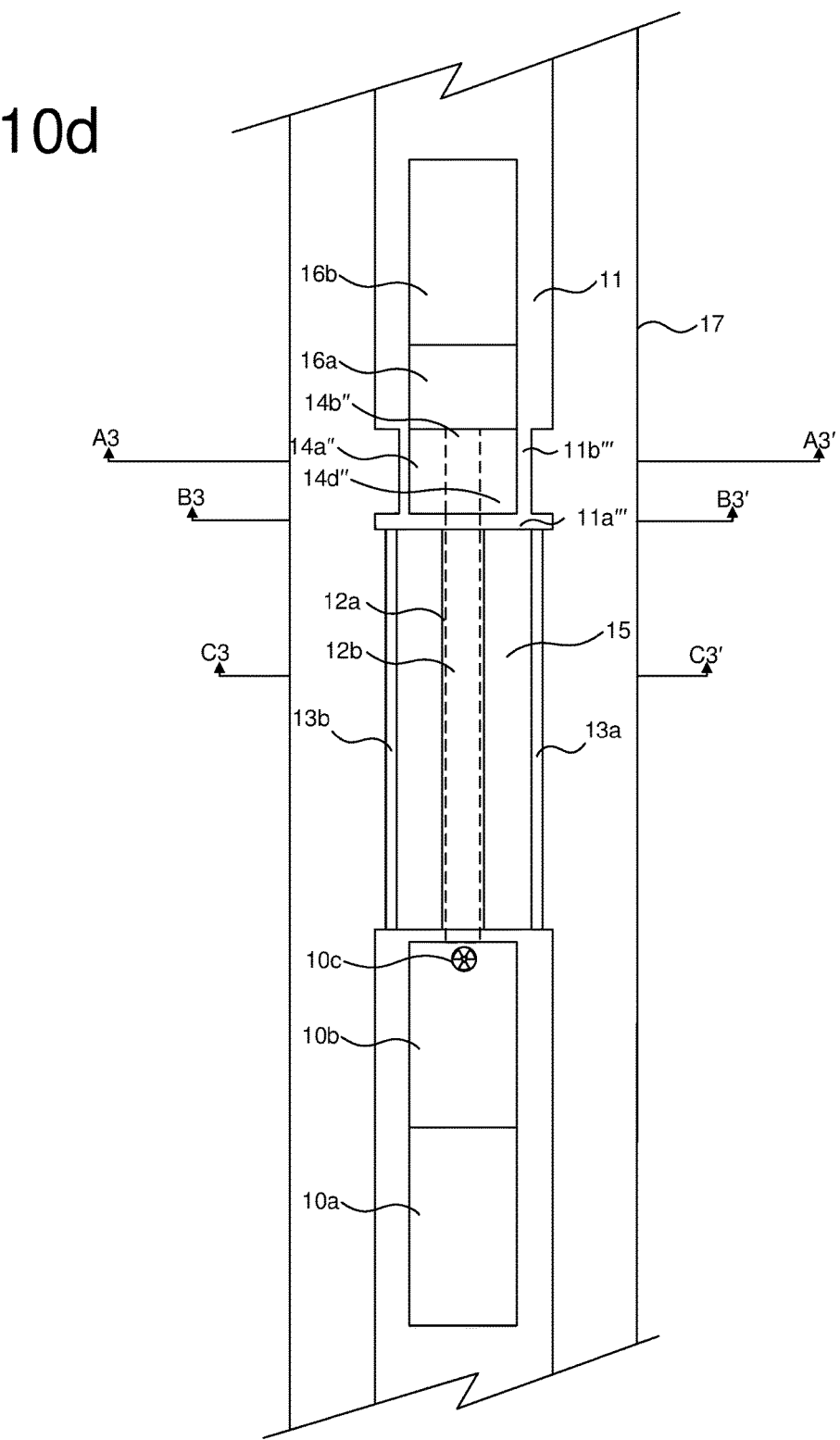
FIG. 10d illustrates a portion of a fluid-density tool including an exemplary x-ray sensor.

The operation of the fluid-density instrument of FIG. 1 may be understood with reference to the exemplary flow depicted in FIG. 6. When the instrument is in the desired location in the borehole, the measurement is started 60. X-rays that travel from the source 10b to the scintillator assembly 14 may interact with the scintillator assembly 14 to create a scintillation event in the first scintillator element 14a or the second scintillator element 14b. The light pulse of the scintillation event is collected 62a when the photomultiplier tube 16a converts the scintillation light pulse to an electronic signal having time characteristics reflective of those of the light pulse. The processing circuitry 16b, via a pulse-width discriminator, categorizes 63 the signal according to its width (and thus categorizes the event as in the first scintillator element 14a or the second scintillator element 14b). The processing circuitry 16b, via a single-channel analyzer (or, optionally, a multi-channel analyzer), then increments the appropriate counter 64a, 64b. A single-channel analyzer for the first scintillator element 14a (the "slow" scintillation material) will count 64b all events in the first scintillator element 14a that also yield a pulse height within a range defined by a lower-level discrimination threshold and an upper-level discrimination threshold. A single-channel analyzer for the second scintillator element 14b (the "fast" scintillation material) will count 64a all events in the second scintillator element 14b that also yield a pulse height within a range defined by a lower-level discrimination threshold and an upper-level discrimination threshold. Multi-channel analyzers may be used to count events as a function of pulse height. The collection of pulses and counting of events repeats 62b for some interval of time or depth in the borehole.

When counting for a given interval is complete, the fast counts and slow counts are combined 65. For example, the total count of events in the first scintillator element 14a may be divided by the total count of events in the second scintillator element 14b to generate a ratio. If a multi-channel analyzer is used, this ratio may be generated for various pulse-height ranges. Other combinations are possible. For example, the difference between the counts may be used. A calibration based on the borehole configuration is applied 66 and an answer is provided 67 for the interval. For example, the ratio of first-scintillator-element counts to second-scintillator-element counts may be linearly related to the density of the borehole fluid 15, with the parameters of the linear relationship (slope and intercept) based on the inner diameter of the casing 17. Other relationships between ratio and fluid density may be appropriate (e.g., a quadratic relationship, or a relationship with a first linearity over a first range of densities and a second linearity of a second range of densities). Calibrations are typically determined through a combination of computer modeling (e.g., Monte Carlo simulation of instrument response) and physical modeling (e.g., measurement of various known fluid densities in various known borehole environments). Once the appropriate calibration is applied to the ratio, the fluid density may be provided by, for example, recording or displaying the density for the interval.

Once the desired measurement is complete, the process stops 69.

The flow of FIG. 7 is similar to the flow of FIG. 6. The difference between the flows is that the FIG. 7 flow allows for adjustment of the x-ray source 10b. That is, the collecting step 72a, categorizing step 73, counting steps 74a, 74b, interval-check step 72b, combining step 75, calibration step 76, and answer step 77 are similar to, respectively, the collecting step 62a, categorizing step 63, counting steps 64a, 64b, interval-check step 62b, combining step 65, calibration step 66, and answer step 67 described with reference to FIG. 6. The difference being that the FIG. 7 flow may account for and utilize control over the intensity or energy of the x-rays generated by the x-ray source 10b while the FIG. 6 flow does not. Thus, the flow of FIG. 6 is appropriate for a chemical source of x-rays and a generator-source of x-rays that is not controlled. The output of the x-ray source 10b is set to a specific intensity or energy by providing the specification of current and voltage to the x-ray source control circuitry 10a. Thus, the answer provided 77 in the FIG. 7 flow may include specification of the intensity or energy of the x-rays generated by the source 10b. For example, based on the count of events in the second scintillator element 14b (the "fast" count), the intensity of x-rays produced by the source 10b may be adjusted up (e.g., to increase count rate and statistical accuracy) or down (e.g., to decrease pulse pile up due to a count rate too high for the scintillator elements or processing circuitry).

A variant of the measurement cage and shielding is shown in FIGS. 8a-8d. In this variant, the portion 11a' of the housing 11 positioned between the source 10b and scintillator assembly 14 includes a disk-shaped longitudinally-thinner section (along the wireline tool's longitudinal axis) that defines a volume 11c' of reduced shielding from x-rays travelling through the borehole fluid 15 as compared to the variant shown in FIGS. 2a-2c. And the portion 11b' of the housing 11 positioned coaxially around the scintillator assembly 14 has separate sections of radially-thinner material to reduce the shielding from x-rays travelling through the borehole as compared to the variant shown in FIGS. 2a-2c. The shielding effects are similar to that described with reference to FIGS. 2a-2c: (1) events in the first scintillator element 14a primarily indicate interactions of x-rays with the borehole fluid, and (2) events in the second scintillator element 14b primarily indicate the output of the source. The rates of events (intensity) in the two scintillator elements 14a, 14b may be combined to provide an indication of x-ray attenuation, and thus borehole-fluid density.

A variant of the measurement cage, shielding, and scintillator assembly is shown in FIGS. 9a-9d. In this variant, the scintillator assembly 14 includes three concentric scintillator elements 14a', 14b', 14d', each with a distinctive scintillation-light-decay time (and thus each with a distinctive width of scintillation light pulse). The three elements 14a', 14b', 14d' may be separated by shields similar to the shield 14c depicted in FIG. 3. The portion 11a" of the housing 11 positioned between the source 10b and scintillator assembly 14 includes several separated longitudinally-thinner sections (along the wireline tool's longitudinal axis) that define further volumes 15a", 15b", 15c" open to borehole fluid 15. These volumes 15a", 15b", 15c" are radially positioned so that the third scintillator element 14d' is less shielded from x-rays traveling through the borehole fluid in the measurement cage than is the first scintillator element 14a' or the second scintillator element 14b'. And the portion 11b" of the housing 11 positioned coaxially around the scintillator assembly 14 has separate sections of radially-thinner material to reduce the shielding from x-rays travelling through the borehole as compared to the variant shown in FIGS. 2a-2c. Thus, (1) events in the first scintillator element 14a' primarily indicate interactions of x-rays with the borehole fluid in the annulus between the fluid-density instrument and the casing 17, (2) events in the second scintillator element 14b' primarily indicate the output of the source, and (3) events in the third scintillator element 14d' primarily indicate interactions of x-rays with the borehole fluid within the measurement cage.

A variant of the measurement cage, shielding, and scintillator assembly is shown in FIGS. 10a-10d. In this variant, the scintillator assembly 14 includes three scintillator elements 14a", 14b", 14d", each with a distinctive scintillation-light-decay time (and thus each with a distinctive width of scintillation light pulse). The first scintillator 14a" and the third scintillator element 14d" are two halves of a ring positioned around the second scintillator element 14b". The three elements 14a", 14b", 14d" may be separated by shields. The portion 11a'" of the housing 11 positioned between the source 10b and scintillator assembly 14 is of a substantially uniform thickness. And the portion 11b'" of the housing 11 positioned coaxially around the scintillator assembly 14 has separate sections of radially-thinner material to reduce the shielding from x-rays travelling through the borehole as compared to the variant shown in FIGS. 2a-2c. These thinner sections are positioned to align with the azimuthal position (relative to the instrument's longitudinal axis) of the first scintillator element 14a" and the third scintillator element 14d". Thus, (1) events in the first scintillator element 14a" primarily indicate interactions of x-rays with the borehole fluid in the annulus between the fluid-density instrument and the casing 17 and on one side of the instrument, (2) events in the second scintillator element 14b" primarily indicate the output of the source, and (3) events in the third scintillator element 14d" primarily indicate interactions of x-rays with the borehole fluid in the annulus between the fluid-density instrument and the casing 17 and on the other side of the instrument. The rates of events (intensity) in the first and second scintillator elements 14a", 14b" may be combined to provide an indication of x-ray attenuation, and thus borehole-fluid density, for paths on one side of the instrument. The rates of events (intensity) in the third and second scintillator elements 14d", 14b" may be combined to provide an indication of x-ray attenuation, and thus borehole-fluid density, for paths on the other side of the instrument.

This may be useful, for example, for detecting multiphase borehole fluid (e.g., water and natural gas) when the phases separate. For instance, the instrument may be oriented in a deviated borehole such that the first scintillator element 14a" is facing down (i.e., oriented (at least partially) along the gravitational force) and the third scintillator element 14d" is facing up (i.e., oriented (at least partially) against to the gravitational force). For borehole fluid comprising natural gas and water, the natural gas may separate and rise to the upper side of the borehole and the water will fall to the lower side of the borehole. Thus, the instrument may provide separate measures of natural gas density and water density.

The operation of a three-scintillator-element sensor in a fluid-density instrument may be understood with reference to the exemplary flow depicted in FIG. 11. This flow is similar to the flow depicted in FIG. 7. The flow of FIG. 11 differs in that it discriminates among three different pulse shapes (fast, medium, slow) 73' and separately counts scintillation events for each pulse shape (and thus each of the three scintillator elements) 74a', 74b', 74c'. These counts may be combined 75' in various ways (e.g., determining a ratio of slow to fast and a ratio of medium to fast) and the various combinations may, through application of calibrations 76', be used to generate information about the borehole environment (e.g., borehole fluid densities for each phase in a multiphase fluid).

Figure 12A:
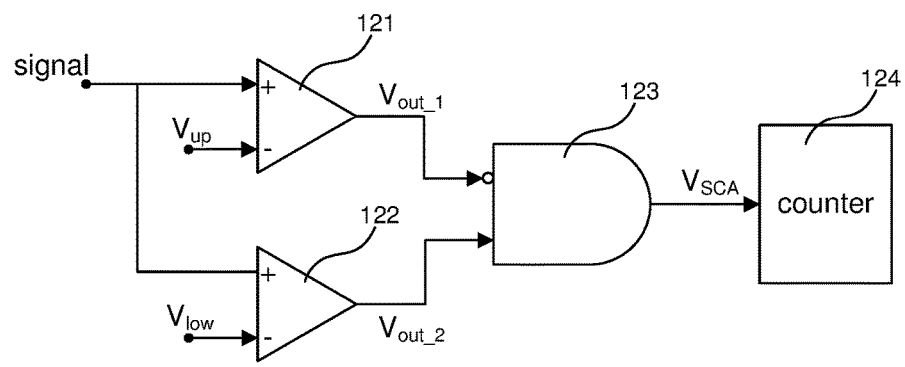
FIGS. 12a and 12b illustrate an exemplary single-channel analyzer that may be used in the invention.

An exemplary single-channel analyzer is depicted in the block diagram of FIG. 12a. The single-channel analyzer includes two comparators 121, 122, an AND gate 123, and a counter 124. The first comparator 121 compares the signal from the detector ("signal," in the figure) to an upper-level reference voltage ($V_{up}$, the upper threshold). If the amplitude of the signal exceeds $V_{up}$, then the first comparator 121 output ($V_{out\_1}$) is a digital "high" or "1" and if the amplitude of the signal is less than $V_{up}$, then $V_{out\_1}$ is a digital "low" or "0." The second comparator 122 compares the signal to a lower-level reference voltage ($V_{low}$, the lower threshold). If the amplitude of the signal exceeds $V_{low}$, then the second comparator 122 output ($V_{out\_2}$) is a digital "high" or "1" and if the amplitude of the signal is less than $V_{low}$, then $V_{out\_2}$ is a digital "low" or "0." The AND gate 123 combines an inverted $V_{out\_1}$ with $V_{out\_2}$. If $V_{out\_1}$ is low (the signal amplitude is below $V_{up}$) and $V_{out\_2}$ is high (the signal amplitude is above $V_{low}$), then the AND gate 123 output ($V_{SCA}$) is high, otherwise, $V_{SCA}$ is low. The counter 124 counts the number of $V_{SCA}$ pulses in a given time interval, keeps those events that have only one count in the interval, and thus counts the number of signal pulses having a maximum amplitude that falls within the voltage "channel" defined by $V_{up}$ and $V_{low}$. The time interval is a function of the width of the detector signal.

Optionally, the upper-level comparator may be omitted and the analyzer may process all events greater than the lower-level threshold. Also optionally, counts may be accepted or rejected based on a measurement of the signal width (e.g., to be accepted, the count event must correspond to a signal having a width within a predetermined range).

Multiple single-channel analyzers (or multiple counters in a single single-channel analyzer), each with a distinct counting time interval, may be used to discriminate detector signals based on the width of the detector signal. Thus, scintillation events may be distinguished based on the scintillator that is the source of the event.

This single-channel analyzer may be equivalently implemented in software operating on digitized detector signals. As is well-known in the art, the detector signal may be digitized by an analog-to-digital converter. The digitization may include periodic sampling (e.g., every 10 ns) to capture the signal pulse amplitude at various points in time and the software may be configured to determine the maximum amplitude (e.g., by comparing sample amplitudes with other sample amplitudes to determine the highest value sample amplitude). Alternately, the digitization captures only a single sample indicative of the pulse signal's maximum amplitude. This maximum amplitude may then be compared to threshold values encoded in the software (e.g., as a software variable). If the maximum amplitude is greater than the lower-level threshold and less than the higher-level threshold, a software counter (e.g., a software variable) is incremented.

Figure 12B:
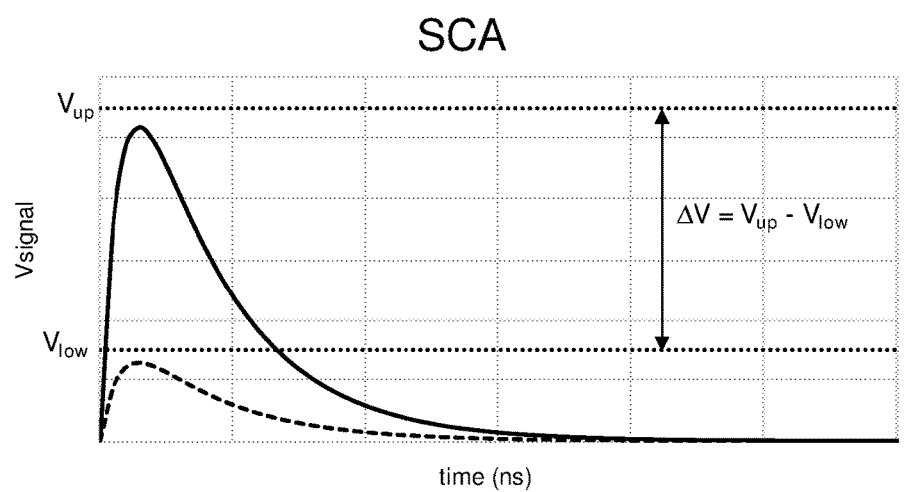

A plot of two detector signal pulses, superimposed in time solely for sake of convenience, is shown FIG. 12*b*. In the plot, the maximum amplitude of the lower-amplitude pulse (shown as a dashed line) is less than $V_{low}$ (shown as a dotted horizontal line). Thus, the lower-amplitude pulse will not be counted. The higher-amplitude pulse (shown as a solid line) has a maximum amplitude greater than $V_{low}$ and less than $V_{up}$ (shown as a dotted horizontal line). Thus, the higher-amplitude pulse will be counted.

Figure 13A:
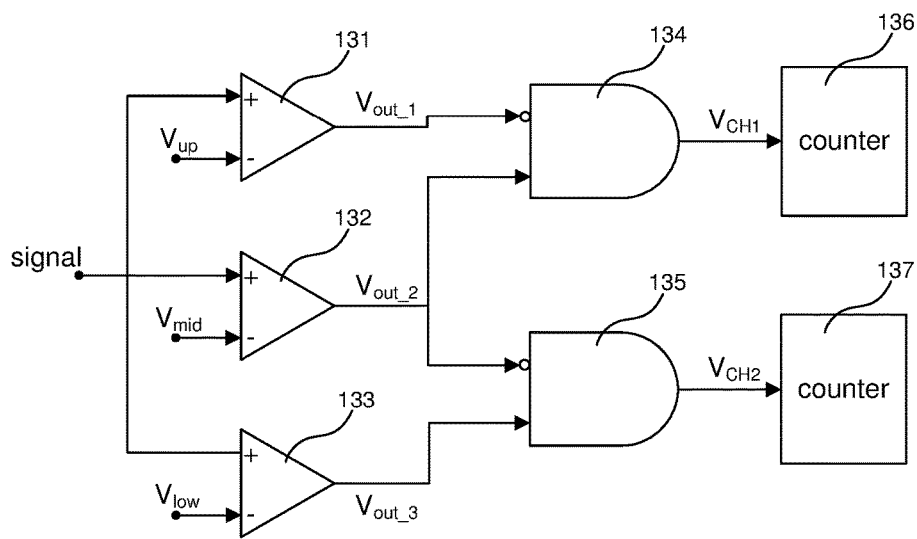
FIGS. 13a and 13b illustrate an exemplary multi-channel analyzer that may be used in the invention.

An exemplary multi-channel analyzer is depicted the block diagram of FIG. 13*a*. The multi-channel analyzer includes three comparators 131, 132, 133, two AND gates 134, 135, and two counters 136, 137. The first comparator 131 compares the signal from the detector ("signal," in the figure) to an upper-level reference voltage ($V_{up}$). If the maximum amplitude of the signal exceeds $V_{up}$, then the first comparator 131 output ($V_{out\_1}$) is a digital "high" or "1" and if the maximum amplitude of the signal is less than $V_{up}$, then $V_{out\_1}$ is a digital "low" or "0." The second comparator 132 compares the signal to a mid-level reference voltage ($V_{mid}$). If the amplitude of the signal exceeds $V_{mid}$, then the second comparator 132 output ($V_{out\_2}$) is a digital "high" or "1" and if the amplitude of the signal is less than $V_{mid}$, then $V_{out\_2}$ is a digital "low" or "0." The third comparator 133 compares the signal to a lower-level reference voltage (Vlow). If the amplitude of the signal exceeds $V_{low}$, then the third comparator 133 output ($V_{out\_3}$) is a digital "high" or "1" and if the amplitude of the signal is less than $V_{low}$, then $V_{out\_3}$ is a digital "low" or "0." The first AND gate 134 combines an inverted $V_{out\_1}$ with $V_{out\_2}$. If $V_{out\_1}$ is low (the signal amplitude is below $V_{up}$) and $V_{out\_2}$ is high (the signal amplitude is above $V_{mid}$), then the AND gate 134 output ($V_{CH1}$) is high, otherwise, $V_{CH1}$ is low. The second AND gate 135 combines an inverted $V_{out\_2}$ with $V_{out\_3}$. If $V_{out\_2}$ is low (the signal amplitude is below $V_{mid}$) and $V_{out\_3}$ is high (the signal amplitude is above $V_{low}$), then the AND gate 134 output ($V_{CH2}$) is high, otherwise $V_{CH2}$ is low. The first counter 136 counts the number of $V_{CH1}$ pulses in a given time interval, keeps those events that have only one count in the interval, and thus counts the number of signal pulses having a maximum amplitude that falls within the voltage "channel" defined by $V_{up}$ and $V_{mid}$. The second counter 137 counts the number of $V_{CH2}$ pulses in a given time interval, keeps those events that have only one count in the interval, and thus counts the number of signal pulses having a maximum amplitude that falls within the voltage "channel" defined by $V_{mid}$ and $V_{low}$. The time interval is a function of the width of the detector signal. More voltage channels may be added by adding more comparators, AND gates, and counters.

Multiple multi-channel analyzers (or multiple counters in a single multi-channel analyzer), each with a distinct counting time interval, may be used to discriminate detector signals based on the width of the detector signal. Thus, scintillation events may be distinguished based on the scintillator that is the source of the event.

This multi-channel analyzer may be equivalently implemented in software operating on digitized detector signals. As is well-known in the art, the detector signal may be digitized by an analog-to-digital converter. The digitization may include periodic sampling (e.g., every 10 ns) to capture the signal pulse amplitude at various points in time and the software may be configured to determine the maximum amplitude (e.g., by comparing sample amplitudes with other sample amplitudes to determine the highest value sample amplitude). Alternately, the digitization captures only a single sample indicative of the pulse signal's maximum amplitude. This maximum amplitude may then be compared to threshold values encoded in the software (e.g., as a software variable). If the maximum amplitude is greater than the lower-level threshold and less than the mid-level threshold, a lower-channel software counter is increments. If the maximum amplitude is greater than the mid-level threshold and less than the higher-level threshold, a higher-channel software counter is incremented. More channels may be added by using more thresholds and counters.

Figure 13B:
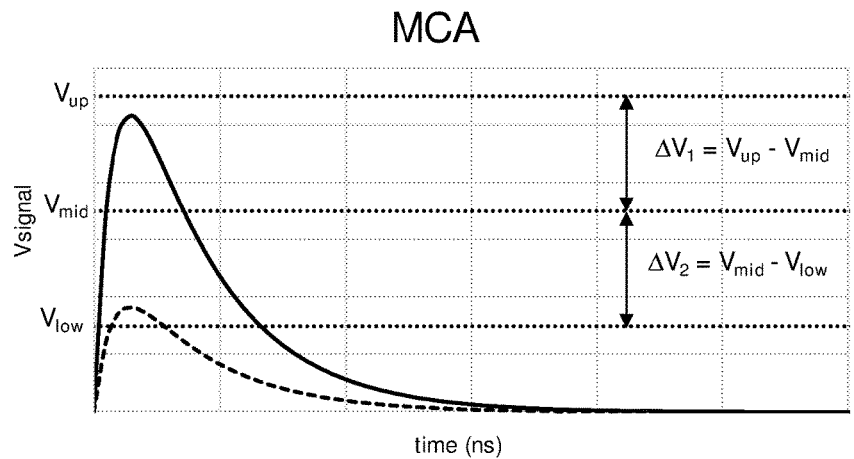

A plot of two detector signal pulses, superimposed in time solely for sake of convenience, is shown FIG. 13*b*. In the plot, the maximum amplitude of the lower-amplitude pulse (shown as a dashed line) is greater than $V_{low}$ (shown as a dotted horizontal line) and less than $V_{mid}$ (shown as a dotted horizontal line). Thus, the lower-amplitude pulse will be counted in the lower channel. The higher-amplitude pulse (shown as a solid line) has a maximum amplitude greater than $V_{mid}$ and less than $V_{up}$ (shown as a dotted horizontal line). Thus, the higher-amplitude pulse will be counted in the higher channel.

Figure 14:
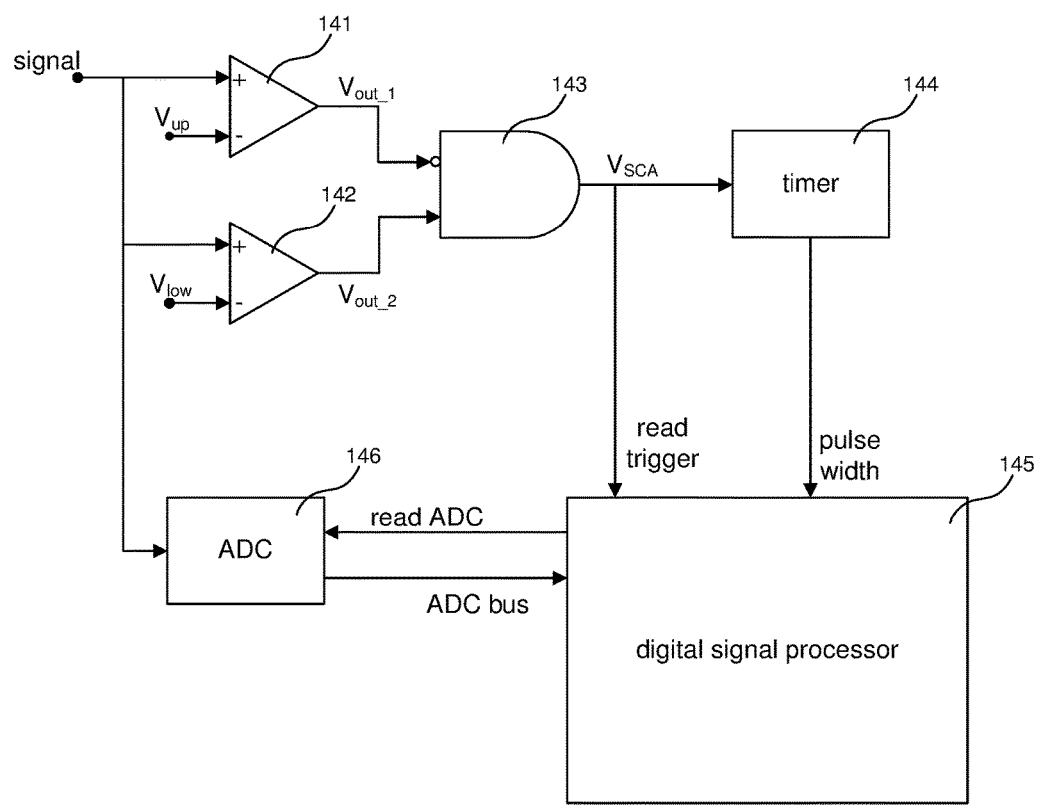
FIG. 14 illustrates and exemplary detector-signal-processing circuit that may be used in the invention.

An exemplary signal-processing circuit is depicted in FIG. 14. The detector signal ("signal," in the figure) is provided as input to two comparators 141, 142 and an analog-to-digital converter (ADC) 146. An upper-level threshold voltage ($V_{up}$) is provided as input to the first comparator 141 and a lower-level threshold voltage ($V_{low}$) is provided as input to the second comparator 142. The outputs ($V_{out\_1}$ and $V_{out\_2}$) of the comparators 141, 143 are combined in an AND gate 143 as described with reference to FIG. 12 above. The output of the AND gate ($V_{SCA}$) is provided to a timer 144 that measures the duration between the low-to-high transition of $V_{SCA}$ (the rising edge) and the following high-to-low transition of $V_{SCA}$ (the falling edge). This duration, the $V_{SCA}$ pulse width, is provided to a processor 145 (a digital signal processor in this example). The $V_{SCA}$ signal is provided as input to the processor 145 as an ADC read trigger. When $V_{SCA}$ is high, the processor 145 clocks the ADC data (the digitized detector signal) into processor 145 memory (e.g., random access memory). (Optionally, the detector signal may be continuously digitized and read and the pulse-amplitude and pulse-width discrimination functions may be entirely implemented in the processor 145.)

The processor 145 acquires a number of samples from the ADC 146 sufficient to distinguish the detector signals based on the scintillator source. For example, a fast-scintillator event may yield a detector signal with an amplitude greater than the lower threshold for around 300 ns and a slow-scintillator event may yield a detector signal with an amplitude greater than the lower threshold for around 3000 ns. In this example, 50 ADC samples at 10 ns intervals would be sufficient to distinguish the fast signal from the slow signal based on the detector-signal width. Similarly, a fast-scintillator event may yield a detector signal with a rise time of around 15 ns and a decay time of around 70 ns and a slow-scintillator event may yield a detector signal with a rise time of around 15 ns and a decay time of around 900 ns. In this example, 120 ADC samples at 10 ns intervals would be sufficient to distinguish the fast signal from the slow signal based on the detector-signal decay time.

The processor categorizes the digitized detector signal according to time characteristics of the signal, such as width, rise time, or decay time. For example, given the set of ADC samples (voltage/time pairs) from a signal, a measure of the signal width (e.g., full-width-at-half-maximum) can be provided by determining the number of samples, n, between voltages at some predetermined level (e.g., half the maximum amplitude) and knowing the sampling interval, T:

$$\text{width} = (n+1) \times T.$$

Once the width is determined, the signal can be associated with a scintillator and thus the locus of the signal event is determined. (It may be sufficient to determine that the signal width is simply greater than some value to determine that the signal is sourced in the slowest scintillator in the instrument. Thus, it may not be necessary to have ADC samples spanning the entire duration of the signal.) The decay time of the signal may also be used to identify the source scintillator. This may be determined by applying a linear-least-squares fit to the natural log of the ADC samples of the signal tail and assuming that the detector decays exponentially. And the processor may simply use the information provided by timer 144 as a measure of pulse width used to correlate a signal with an event in a specific scintillator.

The signal-processing circuit of FIG. 14 has the timer 144 and ADC 146 as external to the processor 145. These components may equivalently be integrated into the processor 145. Likewise, the ADC is depicted as read into memory integrated into the processor 145 but may equivalently be read into memory external to the processor 145.

Figure 15:
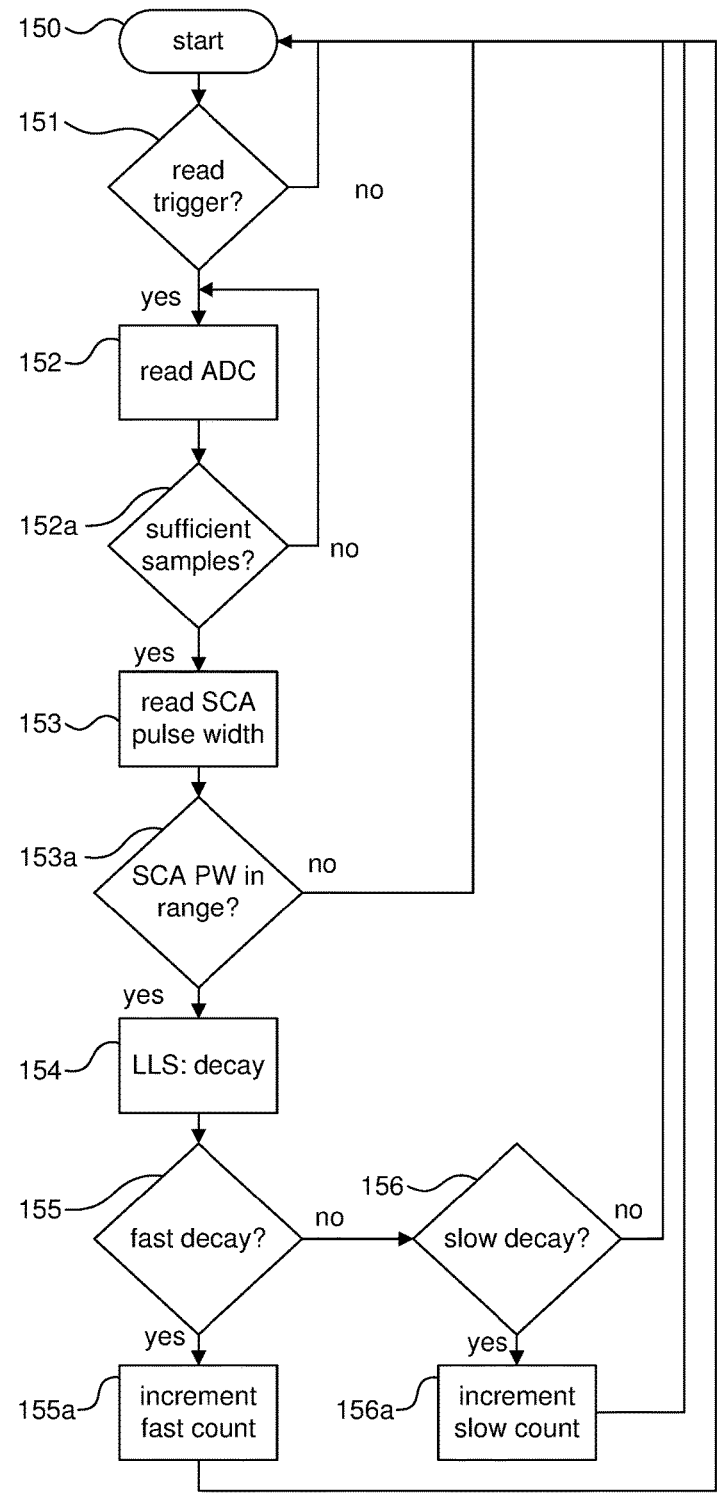
FIG. 15 illustrates and exemplary flow for detector-signal processing in a processor circuit.

An exemplary processor 145 processing flow is depicted in FIG. 15. The flow is run (or continued) at the start 150. The read trigger line is monitored 151 to determine when to read the ADC to capture a detector event. (Equivalently, the read trigger may generate an interrupt.) When triggered, the ADC values are read into processor memory 152 until some determined number of samples are collected 152a (this number is based on the range of detector-signal widths for the instrument and the ADC sampling interval). The SCA pulse width provided by a timer is read 153 and compared 153a with the acceptable range of pulse widths for the instrument (this range is based on the range of detector-signal widths for the instrument). Once the ADC samples are collected and the SCA pulse width is determined to be within the acceptable range, the decay rate of the detector signal is determined through a curve fit 154. For example, a straight line may be fit to the natural logarithm of the ADC voltage samples of the tail through a linear least squares fitting procedure. The slope of this line is related to the detector-signal decay. The derived detector-signal decay is compared to the predetermined values for the scintillators 155, 156 and the appropriate counter is incremented 155a, 156a. This process continues until stopped.

Figure 16A:
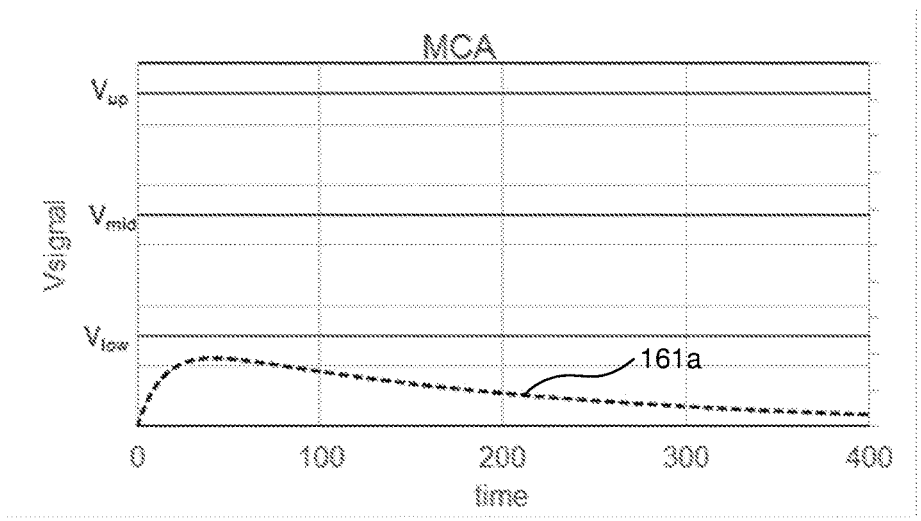
FIGS. 16a-16d illustrate exemplary timing diagrams for an exemplary multi-channel analyzer that may be used in the invention.
Figure 16B:
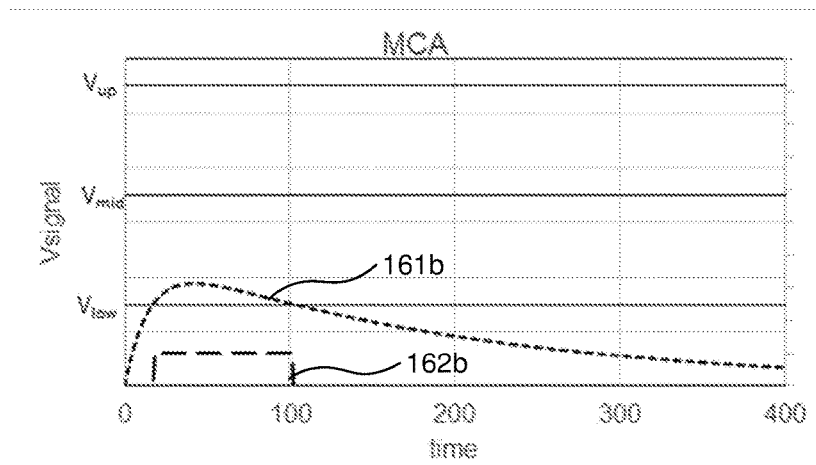
Figure 16C:
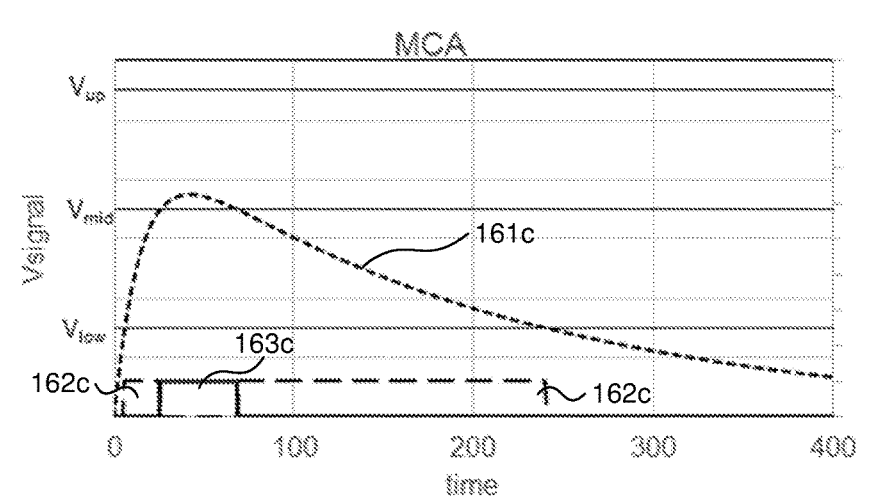
Figure 16D:
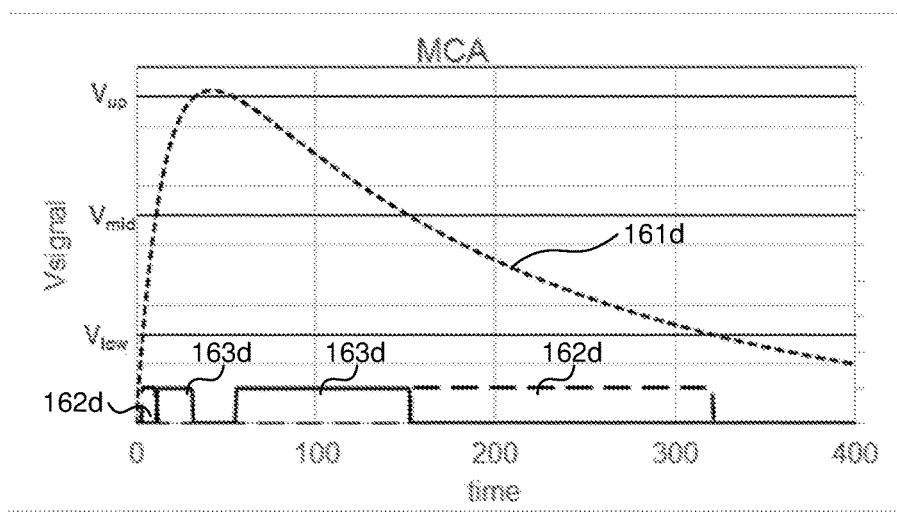

FIGS. 16a-16d depict exemplary timing diagrams for the multi-channel analyzer depicted in FIG. 13 with a counting interval of 400 ns from the start of the detector signal. This counting interval may begin when the detector signal reaches the lower-level threshold ($V_{low}$), i.e., $V_{out\_3}$ is high, but the inputs to the counter 136, 137 may be delayed so that the interval effectively begins at the start of the detector signal. In FIG. 16a, the detector signal 161a never reaches the lower-level threshold ($V_{low}$). Therefore, no count is recorded in either channel. In FIG. 16b, the detector signal 161b reaches the lower-level threshold but never exceeds the mid-level threshold ($V_{mid}$). Therefore, the MCA generates one $V_{CH2}$ pulse 162b (long-dashed line) and the event is recorded in the MCA's lower-energy channel. In FIG. 16c, the detector signal 161c reaches the mid-level threshold but never exceeds the upper-level threshold ($V_{up}$). Therefore, the MCA generates one $V_{CH1}$ pulse 163c (solid line) and two $V_{CH2}$ pulses 162c (long-dashed line) and the event is recorded in the MCA's upper-energy channel. In FIG. 16d, the detector signal 161d exceeds the upper-level threshold. Therefore, and MCA generates two $V_{CH1}$ pulses 163d (solid line) and two $V_{CH2}$ pulses 162d (long-dashed line) and the event is not recorded in either channel.

Figure 17A:
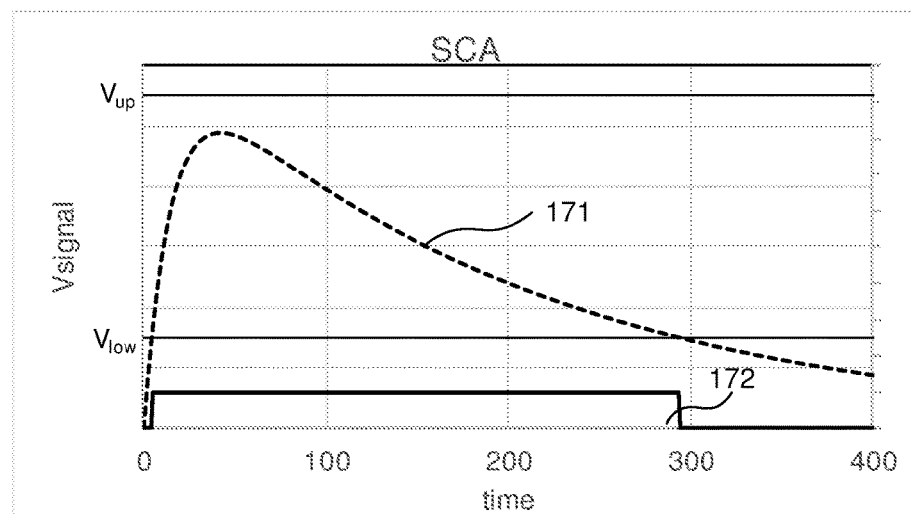
FIG. 17a illustrates an exemplary timing diagram for an exemplary single-channel analyzer that may be used in the invention.
Figure 17B:
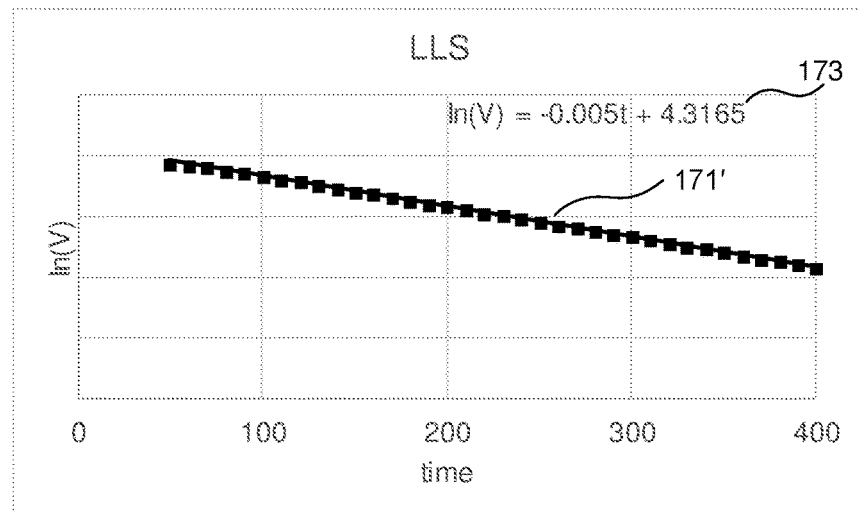
FIG. 17b illustrates an exemplary processing of a digitized detector signal to determine timing characteristics of the detector signal (and thus determine the scintillator source of the signal).

FIG. 17a depicts an exemplary timing diagram for the single-channel analyzer depicted in FIG. 12, or equivalently, the front end to the signal processing circuit depicted in FIG. 14. FIG. 17b depicts an exemplary straight-line linear-least-square fit to the tail of a digitized detector signal to determine the detector-signal decay (and thereby determine in which scintillator the event occurred). In FIG. 17a, the detector signal 171 reaches the lower-level threshold ($V_{low}$) but never exceeds the upper-level threshold ($V_{up}$). Therefore, the SCA generates one $V_{SCA}$ pulse 172 (solid line). For the FIG. 12 SCA, the event is counted in counter 124. For the FIG. 14 front end, the width of the $V_{SCA}$ pulse 172 (the time from the rising edge to the falling edge) is determined by timer 144 to be read by processor 145. In FIG. 17b, the natural logarithm of the tail of the digitized detector signal voltage 171' (square markers) is fit with a straight line 173 according to a linear-least-squares approach. For the idealized detector signal depicted in FIGS. 17a and 17b, the slope (−0.005) corresponds to a decay time of 200 ns (1/0.005).

Figure 18A:
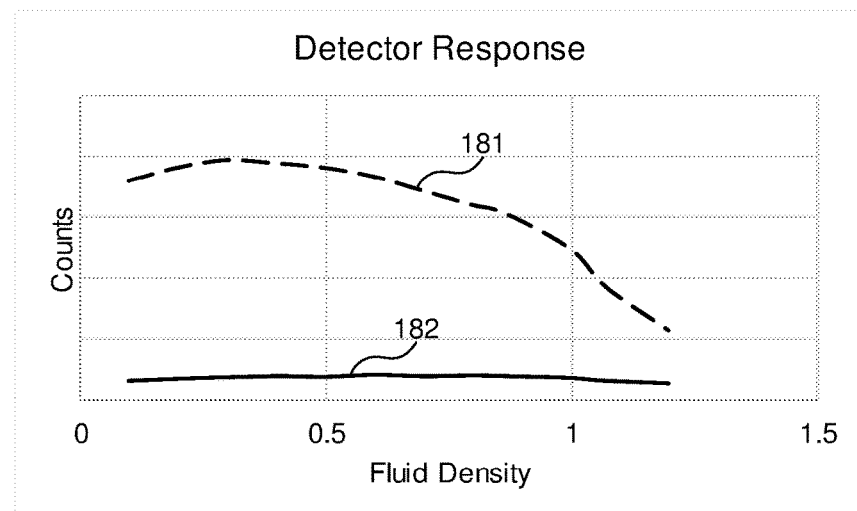
FIGS. 18a-18b illustrate exemplary detector responses for an exemplary fluid-density instrument.
Figure 18B:
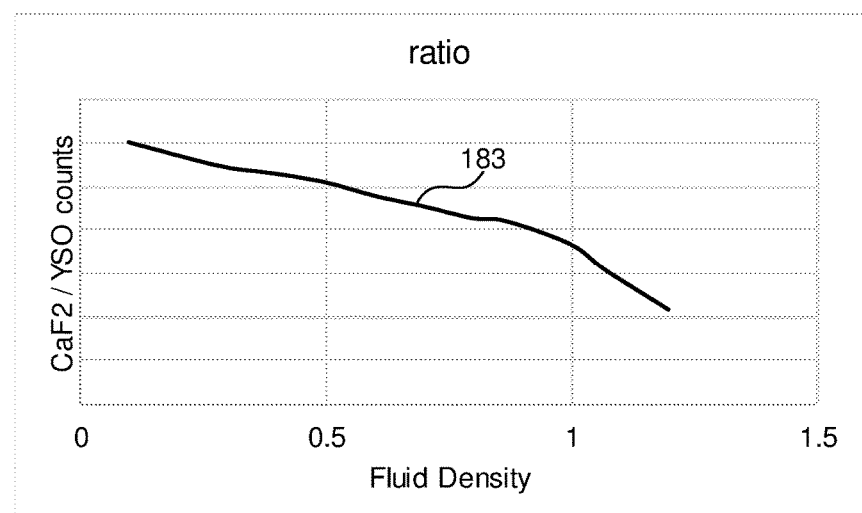

FIGS. 18a-18b depict exemplary detector responses for an exemplary two-scintillator fluid-density instrument. Here, the slow scintillator (the outer ring scintillator 14a in FIG. 2) is $CaF_2$ and the fast scintillator (the inner cylinder 14b in FIG. 2) is YSO. FIG. 18a depicts the counts in a given time interval (equivalently, count rate) for the scintillators as a function of the density of the fluid 15 in FIG. 1. The long-dashed line 181 is the CaF$_2$ response. The solid line 182 is the YSO response. FIG. 18b depicts the ratio 183 of CaF$_2$ to YSO counts as a function of fluid density. Note that for this instrument configuration there is ambiguity in determining fluid density based on either individual detector response because the curves are double valued at some points (two fluid densities associated with a given count). This ambiguity vanishes when the ratio of the CaF$_2$ to YSO counts is considered. Thus, the fluid-density measurement is improved by being able to distinguish the events based on the scintillator-source of the event.

While the foregoing description is directed to the preferred embodiments of the invention, other and further embodiments of the invention will be apparent to those skilled in the art and may be made without departing from the basic scope of the invention. And features described with reference to one embodiment may be combined with other embodiments, even if not explicitly stated above, without departing from the scope of the invention. For example, the invention is not necessarily limited to tools deployed via wireline and is not necessarily limited to measuring borehole-fluid density. Rather, the invention may be incorporated in instruments that are deployed by, for example, slick line, tubing, or drill string. And the invention may be configured to provide a measure of the attenuation of photons through a path passing through other than borehole fluid (e.g., a path through the casing or formation outside the casing). The scope of the invention is defined by the claims which follow.

The invention claimed is:

1. A photon-beam sensor comprising:
   (a) a first radiation detector configured to provide a first electronic pulse indicative of a radiation event wherein the first electronic pulse has a characteristic time parameter;
   (b) a second radiation detector configured to provide a second electronic pulse indicative of a radiation event wherein the second electronic pulse has a characteristic time parameter that is different from the characteristic time parameter of the first electronic pulse;
   (c) a pulse-shape discriminator configured to distinguish the first electronic pulse from the second electronic pulse based on the characteristic time parameter of the first electronic pulse and the characteristic time parameter of the second electronic pulse; and
   (d) a first shield assembly configured to provide a first radiation path to a first detector and a second radiation path to the second detector, wherein the first radiation path and the second radiation path each are configured to accept a material such that the first radiation path is configured to accept more of the material than is the second radiation path.

2. The photon-beam sensor of claim 1 wherein:
   (a) the characteristic time parameter of the first electronic pulse is one of the group consisting of a pulse width, a pulse rise time, and a pulse decay time; and
   (b) the characteristic time parameter of the second electronic pulse is one of the group consisting of a pulse width, a pulse rise time, and a pulse decay time.

3. The photon-beam sensor of claim 1 further comprising:
   (a) a first counter to count the first electronic pulse; and
   (b) a second counter to count the second electronic pulse.

4. The photon-beam sensor of claim 3 further comprising a controllable radiation source.

5. The photon-beam sensor of claim 4 wherein in the controllable radiation source is configured to output an intensity of radiation based on detector information that is one of the group consisting of:
   (a) a count of the first electronic pulse from the first counter;
   (b) a count of the second electronic pulse from the second counter; and
   (c) a combination of a count of the first electronic pulse from the first counter and a count of the second electronic pulse from the second counter.

6. A method for estimating the density of a material, the method comprising:
   (a) providing a first radiation detector configured to provide a first radiation-detection signal having a characteristic time parameter;
   (b) providing a second radiation detector configured to provide a second radiation-detection signal having a characteristic time parameter;
   (c) providing a radiation shield having a first radiation path to the first radiation detector and a second radiation path to the second radiation detector;
   (d) positioning a material relative to the shield such that the first radiation path includes more of the material than does the second radiation path;
   (e) providing a first measure indicative of an intensity of radiation incident on the first radiation detector using the characteristic time parameter of the first radiation-detection signal;
   (f) providing a second measure indicative of an intensity of radiation incident on the second radiation detector using the characteristic time parameter of the second radiation-detection signal;
   (g) combining the first measure with the second measure to provide an estimate of the density of the material.

7. The method of claim 6 further comprising providing a controllable radiation source.

8. The method of claim 7 further comprising controlling the controllable radiation source based on information that is one of the group consisting of the first measure, the second measure, and the combination of the first measure with the second measure.

* * * * *